US012593343B2

(12) United States Patent
Kang et al.

(10) Patent No.: US 12,593,343 B2
(45) Date of Patent: Mar. 31, 2026

(54) APPARATUS AND METHOD FOR PROCESSING SIDELINK RESOURCE REQUIRED FOR SIDELINK DRX OPERATION IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 18/017,273

(22) PCT Filed: Jul. 21, 2021

(86) PCT No.: PCT/KR2021/009373
§ 371 (c)(1),
(2) Date: Jan. 20, 2023

(87) PCT Pub. No.: WO2022/019629
PCT Pub. Date: Jan. 27, 2022

(65) Prior Publication Data
US 2023/0269755 A1      Aug. 24, 2023

(30) Foreign Application Priority Data

Jul. 22, 2020    (KR) ........................ 10-2020-0091297
May 7, 2021    (KR) ........................ 10-2021-0059292

(51) Int. Cl.
H04W 72/25      (2023.01)
H04W 72/54      (2023.01)
H04W 76/28      (2018.01)

(52) U.S. Cl.
CPC ........... H04W 72/25 (2023.01); H04W 72/54 (2023.01); H04W 76/28 (2018.02)

(58) Field of Classification Search
None
See application file for complete search history.

(56) References Cited

U.S. PATENT DOCUMENTS

2020/0145867 A1    5/2020   Tseng et al.
2020/0266857 A1    8/2020   Hwang et al.
(Continued)

FOREIGN PATENT DOCUMENTS

WO      2020/091346 A1    5/2020
WO      2020/130930 A1    6/2020
(Continued)

OTHER PUBLICATIONS

3rd Generation Partnership Project; Technical Specification Group Radio Access Network; NR; Physical layer procedures for data (Release 15), 3GPP TS 38.214, V15.10.0, Sophia-Antipolis Cedex, France, Jul. 17, 2020.
(Continued)

*Primary Examiner* — Diane L Lo
(74) *Attorney, Agent, or Firm* — Jefferson IP Law, LLP

(57)      ABSTRACT

The present disclosure relates to a communication technique for combining an IoT technology with a 5G communication system for supporting a higher data transmission rate than a 4G system, and a system therefor. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. The present disclosure provides a method and apparatus for processing a sidelink resource related to DRX of a terminal
(Continued)

that performs sidelink-based data transmission and reception in a wireless communication system. In addition, the present disclosure provides a method and apparatus for processing sidelink-reference signal received power (SL-RSRP) and/or channel state information (CSI) reporting when sidelink DRX is configured in a wireless communication system.

10 Claims, 23 Drawing Sheets

(56) References Cited

U.S. PATENT DOCUMENTS

| 2021/0227464 | A1* | 7/2021 | Kung | H04W 76/14 |
| 2021/0227621 | A1* | 7/2021 | Pan | H04W 72/0446 |
| 2022/0078879 | A1 | 3/2022 | Nimbalker et al. | |
| 2023/0007728 | A1* | 1/2023 | Kung | H04W 72/20 |
| 2023/0014303 | A1* | 1/2023 | Di Girolamo | H04W 72/20 |
| 2023/0209644 | A1* | 6/2023 | Han | H04W 52/0274 |
| | | | | 370/328 |

FOREIGN PATENT DOCUMENTS

| WO | 2020/144188 A1 | 7/2020 |
| WO | 2020/145267 A1 | 7/2020 |
| WO | 2020/145803 A1 | 7/2020 |

OTHER PUBLICATIONS

European Search Report dated Jan. 5, 2024, European Application No. 21845221.7.
Huawei et al., 'Discussion on remaining MAC open issues for 5G V2X with NR SL', R2-2005492, 3GPP TSG-RAN WG2 Meeting #110 electronic, May 22, 2020.

* cited by examiner 720a                                                720b

1300 — WUS grant for broadcast

1302 — WUS grant for unicast A

APPARATUS AND METHOD FOR PROCESSING SIDELINK RESOURCE REQUIRED FOR SIDELINK DRX OPERATION IN WIRELESS COMMUNICATION SYSTEM

TECHNICAL FIELD

The disclosure relates to a wireless communication system, and more particularly, to a method and apparatus for processing sidelink resources related to a discontinuous reception (DRX) operation of a terminal performing sidelink-based data transmission and reception in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in extremely high frequency (mmWave) bands (e.g., 60 GHz band) so as to accomplish higher data rates. To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system.

In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (CoMP), reception-end interference cancellation, and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

In addition, sidelink communication using the 5G communication system is being researched, and the sidelink communication is expected to be applied to, for example, vehicle-to-everything (hereinafter referred to as 'V2X') to provide various services to users.

As various services can be provided as discussed above with the growth of a wireless communication system, a scheme of supporting a sidelink DRX procedure is particularly required.

DISCLOSURE OF INVENTION

Technical Problem

The disclosure is intended to provide a method and apparatus for processing sidelink resources related to DRX of a terminal performing sidelink-based data transmission and reception in a wireless communication system.

The disclosure is intended to provide a method and apparatus for processing sidelink-reference signal received power (SL-RSRP) and/or channel state information (CSI) reporting in the case that sidelink DRX is configured in a wireless communication system.

Solution to Problem

According to an embodiment of the disclosure, a method performed by a sidelink transmitting terminal in a wireless communication system may include identifying whether sidelink discontinuous reception (DRX) is configured in the sidelink transmitting terminal, transmitting a signal for a measurement report to a sidelink receiving terminal, and when the sidelink DRX is configured, receiving, from the sidelink receiving terminal, the measurement report for the signal in a sidelink active time of the sidelink DRX.

In the method, the measurement report may be either a sidelink-reference signal received power (SL-RSRP) report or a channel state information (CSI) report.

In the method, the measurement report may not be received at a time other than the sidelink active time of the sidelink DRX when the sidelink DRX is configured.

The method may further include receiving, from a base station, sidelink resource allocation information for aligning sidelink active times of the sidelink transmitting terminal and the sidelink receiving terminal, and the measurement report may be received in the sidelink active time of the sidelink DRX based on the sidelink resource allocation information.

According to another embodiment of the disclosure, a sidelink transmitting terminal in a wireless communication system may include a transceiver transmitting and receiving signals, and a controller connected to the transceiver and configured to identify whether sidelink discontinuous reception (DRX) is configured in the sidelink transmitting terminal, to transmit a signal for a measurement report to a sidelink receiving terminal, and to, when the sidelink DRX is configured, receive, from the sidelink receiving terminal, the measurement report for the signal in a sidelink active time of the sidelink DRX.

According to still another embodiment of the disclosure, a method performed by a sidelink receiving terminal in a wireless communication system may include identifying whether sidelink discontinuous reception (DRX) is configured in the sidelink receiving terminal, receiving a signal for a measurement report from a sidelink transmitting terminal, and when the sidelink DRX is configured, transmitting, to the sidelink transmitting terminal, the measurement report for the signal in a sidelink active time of the sidelink DRX.

According to yet another embodiment of the disclosure, a sidelink receiving terminal in a wireless communication system may include a transceiver transmitting and receiving signals, and a controller connected to the transceiver and configured to identify whether sidelink discontinuous reception (DRX) is configured in the sidelink receiving terminal, to receive a signal for a measurement report to a sidelink transmitting terminal, and to, when the sidelink DRX is configured, transmit, to the sidelink transmitting terminal, the measurement report for the signal in a sidelink active time of the sidelink DRX.

Advantageous Effects of Invention

The disclosed embodiments provide an apparatus and method capable of effectively providing services in a mobile communication system.

According to the disclosure, a terminal that transmits and receives sidelink data can efficiently manage power by processing a measurement report only during an active time upon a DRX operation.

MODE FOR THE INVENTION

Figure 1:
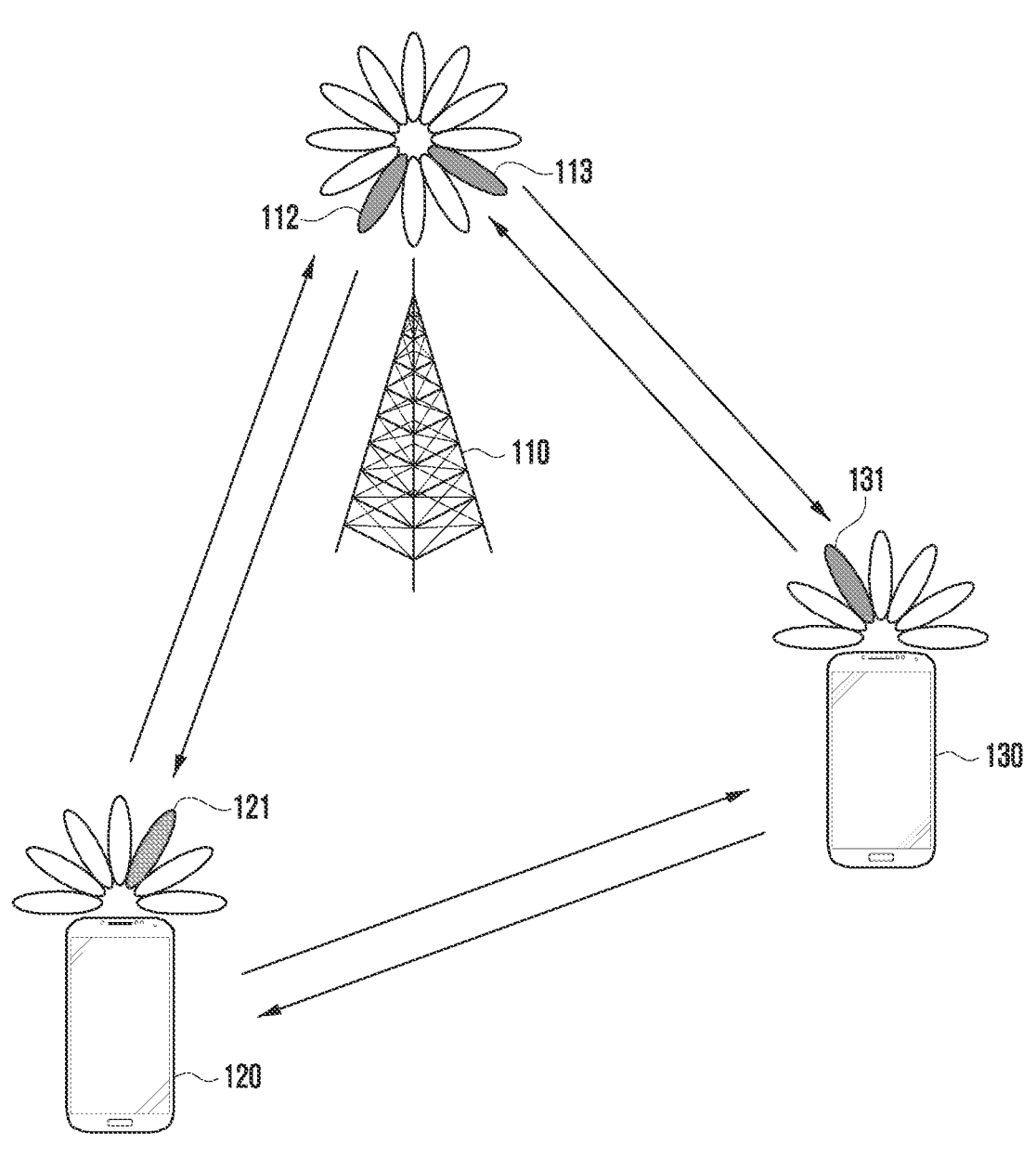
FIG. 1 is a diagram illustrating a wireless communication system according to an embodiment of the disclosure.

Hereinafter, embodiments of the disclosure will be described in detail with reference to the accompanying drawings. It should be noted that in the accompanying drawings, the same element is indicated by the same reference numeral as much as possible. In addition, detailed descriptions of well-known functions and elements that may obscure the subject matter of the disclosure will be omitted.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

Embodiments of the disclosure will be described herein focusing a wireless access network, i.e., new radio (NR), and a packet core, i.e., a 5G system, a 5G core network, or a next generation (NG) core, according to the 5G mobile communication standard specified by the 3rd generation partnership project (3GPP) which is a mobile communication standardization organization. However, the subject matter of the disclosure can be also applied to other communication systems having similar technical backgrounds through slight modification without departing from the scope of the disclosure as will be apparent to those skilled in the art.

In the 5G system, a network data collection and analysis function (NWDAF), which is a network function of collecting, analyzing, and providing data in the 5G network, may be defined so as to support network automation. The NWDAF may collect information from the 5G network, store and analyze the collected information, and provide a result of analysis to an unspecified network function (NF). The result of analysis may be used independently in each NF.

Some terms and names defined in the 3GPP standards (e.g., 5G, NR, LTE, or similar system standards) will be used for the convenience of description. However, the disclosure is not limited by such terms and names, and may be also applied to any other system that complies with any other standard.

Hereinafter, the disclosure relates to a method and apparatus for processing sidelink DRX-related resources by a UE that performs sidelink-based data transmission and reception in a wireless communication system. The disclosure provides a method and apparatus for processing sidelink DRX resources at a UE performing data transmission and a UE performing data reception, based on sidelink unicast, sidelink groupcast, and sidelink broadcast in a wireless communication system.

Specifically, the disclosure may include an operation of, at UE that determines time points of transmitting and receiving a wake-up signal (WUS) of sidelink DRX and transmits the wake-up signal, acquiring wake-up signal transmission resources and transmitting the wake-up signal, an operation of, at a UE that monitors the wake-up signal, determining the necessity of wake-up signal monitoring and monitoring the wake-up signal, and an operation of monitoring sidelink data indicated by the wake-up signal when the wake-up signal exists. The disclosure may include an operation of, at a UE performing sidelink DRX, releasing a transmission resource or requesting a base station to release a transmission resource in a DRX inactive time. The disclosure may include an operation of, at a UE performing sidelink DRX, not performing channel state information (CSI) reporting or reference signal received power (RSRP) reporting for sidelink unicast link control in a DRX inactive time. According to embodiments of the disclosure, by enabling a UE to perform a sidelink DRX operation, it is possible to minimize UE battery usage that is consumed in monitoring unnecessarily data.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

Hereinafter, a base station is a subject that performs resource allocation of a terminal, and may be at least one of a gNode B (gNB), an eNode B (eNB), a Node B, a base station (BS), a radio access unit, a base station controller, or a node on a network. A terminal may include a user equipment (UE), a mobile station (MS), a mobile phone, a smart phone, a computer, or a multimedia system capable of performing a communication function. However, this is only exemplary, and the base station and the terminal are not limited to this example. In the disclosure, an eNB may be used interchangeably with a gNB for convenience of description. That is, a base station described as an eNB may indicate a gNB. In the disclosure, the term terminal may indicate various wireless communication devices as well as a mobile phone, NB-IoT devices, and sensors.

In the following description, a physical channel and a signal may be used interchangeably with data or a control signal. For example, although a physical downlink shared channel (PDSCH) is a term referring to a physical channel through which data is transmitted, the PDSCH may also be used for referring to data. That is, in the disclosure, the expression 'transmitting a physical channel' may be interpreted as equivalent to the expression 'transmitting data or signals through a physical channel'.

Hereinafter, in the disclosure, higher signaling refers to a method of transmitting a signal from a base station to a UE using a downlink data channel of a physical layer or from a UE to a base station using an uplink data channel of a physical layer. The higher signaling may be understood as radio resource control (RRC) signaling or an MAC control element (CE).

Further, in the disclosure, in order to determine whether a specific condition is satisfied or fulfilled, an expression of more than or less than is used, but this is only a description for expressing an example and does not exclude a description of a specific number or more or a specific number or lower. A condition described as a 'specific number or more' may be replaced with 'more than a specific number', a condition described as a 'specific number or lower' may be replaced with 'less than a specific number', and a condition described as a 'specific number or more and less than a specific number' may be replaced with 'more than a specific number and a specific number or lower'.

Further, although the disclosure describes various embodiments using terms used in some communication standards (e.g., 3rd generation partnership project (3GPP)), this is only an example for description. Various embodiments of the disclosure may be easily modified and applied in other communication systems.

FIG. 1 is a diagram illustrating a wireless communication system according to an embodiment of the disclosure.

With reference to FIG. 1, a base station 110, a first UE 120, and a second UE 130 are exemplarily shown as some of nodes using a radio channel in a wireless communication system. Although FIG. 1 illustrates only one base station, other base stations that are the same as or similar to the base station 110 may be further included.

The base station 110 is a network infrastructure that provides radio access to the UEs 120 and 130. The base station 110 has coverage defined as a predetermined geographic area based on a distance capable of transmitting a signal. In addition to the base station, the base station 110 may be referred to as an 'access point (AP)', 'eNodeB (eNB)', '5th generation node (5G node)', 'next generation nodeB (gNB)', 'wireless point', 'transmission/reception point (TRP)', or any other term having an equivalent technical meaning.

The first UE 120 and the second UE 130 are devices used by users and can perform communication with the base station 110 through a radio channel A link from the base station 110 to the first UE 120 or the second UE 130 is referred to as a downlink (DL), and a link from the first UE 120 or the second UE 130 to the base station 110 is referred to as an uplink (UL). Also, the first UE 120 and the second UE 130 can perform communication with each other through a radio channel. In this case, a link between the first UE 120 and the second UE 130 is referred to as a sidelink, and the sidelink may also be referred to as a PC5 interface. In some cases, at least one of the first UE 120 and the second UE 130 may be operated without the user's involvement. That is, at least one of the first UE 120 and the second UE 130 may not be carried by the user, as a device that performs machine type communication (MTC). Each of the first UE 120 and the second UE 130 may be referred to as a 'terminal', 'user equipment (UE)', 'mobile station', 'subscriber station', 'remote terminal', 'wireless terminal', 'user device', or any other term having an equivalent technical meaning.

The base station 110, the UE first 120, and the second UE 130 can transmit and receive radio signals in mmWave bands (e.g., 28 GHz, 30 GHz, 38 GHz, and 60 GHz). In this case, in order to improve a channel gain, the base station 110, the first UE 120, and the second UE 130 may perform beamforming Here, beamforming may include transmission beamforming and reception beamforming. That is, the base station 110, the first UE 120, and the second UE 130 may impart directivity to a transmission signal or a reception signal. To this end, the base station 110 and the UEs 120 and 130 may select serving beams 112, 113, 121, and 131 through a beam search or beam management procedure. After the serving beams 112, 113, 121, and 131 are selected, subsequent communication may be performed through a resource in a quasi-co-located (QCL) relationship with a resource that has transmitted the serving beams 112, 113, 121, and 131.

If large-scale characteristics of a channel that has transmitted a symbol on a first antenna port may be inferred from a channel that has transmitted a symbol on a second antenna port, the first antenna port and the second antenna port may be evaluated to be in a QCL relationship. For example, the large-scale characteristics may include at least one of delay spread, Doppler spread, Doppler shift, average gain, average delay, or spatial receiver parameter.

The first UE 120 and the second UE 130 shown in FIG. 1 can support vehicle communication. In the case of vehicle communication, standardization work for vehicle to everything (V2X) technology was completed in 3GPP Release 14 and Release 15 based on the device-to-device (D2D) communication structure in the LTE system, and efforts are currently being made to develop V2X technology based on 5G NR. In the NR V2X, unicast communication, groupcast (or multicast) communication, and broadcast communication are planned to be supported between UE. In addition, unlike the LTE V2X that aims to transmit and receive basic safety information required for road driving of a vehicle, the NR V2X aims to provide more advanced services such as platooning, advanced driving, extended sensors, and remote driving.

V2X services may be divided into basic safety services and advanced services. The basic safety services may include a vehicle notification (cooperative awareness messages (CAM) or basic safety message (BSM)) service and detailed services such as a left turn notification service, a front collision warning service, an emergency vehicle approach notification service, a forward obstacle warning service, and an intersection signal information service, and V2X information may be transmitted/received using a broadcast, unicast, or groupcast transmission scheme. The advanced services not only have stronger quality of service (QoS) requirements than the basic safety services, but also require a scheme of transmitting/receiving V2X information by using unicast and groupcast transmission schemes in addition to broadcast such that V2X information can be transmitted/received within a specific vehicle group or between two vehicles. The advanced services may include detailed services such as a platooning service, an autonomous driving service, a remote driving service, and an extended sensor-based V2X service.

Hereinafter, a sidelink (SL) refers to a transmission/reception path for a signal between UEs and may be used interchangeably with a PC5 interface. Hereinafter, a base station, as a subject that performs resource allocation of a UE, may be a base station supporting both V2X communication and general cellular communication, or a base station supporting only V2X communication. That is, the base station may refer to an NR base station (e.g., gNB), an LTE base station (e.g., eNB), or a road site unit (RSU). Generally including a user equipment (UE) or a mobile station, a terminal may include a vehicle that supports vehicle-to-vehicle (V2V) communication, a vehicle or a pedestrian's handset (e.g., a smartphone) that supports vehicle-to-pedestrian (V2P) communication, a vehicle that supports vehicle-to-network (V2N) communication, a vehicle that supports vehicle-to-infrastructure (V2I) communication, an RSU having a UE function, an RSU having a base station function, or an RSU having a part of the base station function and a part of the UE function. In addition, a V2X UE used in the description below may be referred to as a UE. That is, in relation to V2X communication, a UE may be used as a V2X UE.

The base station and the UE may be connected through a Uu interface. An uplink (UL) refers to a radio link through which the UE transmits data or control signals to the base station, and a downlink (DL) refers to a radio link through which the base station transmits data or control signals to the UE.

Figure 2:
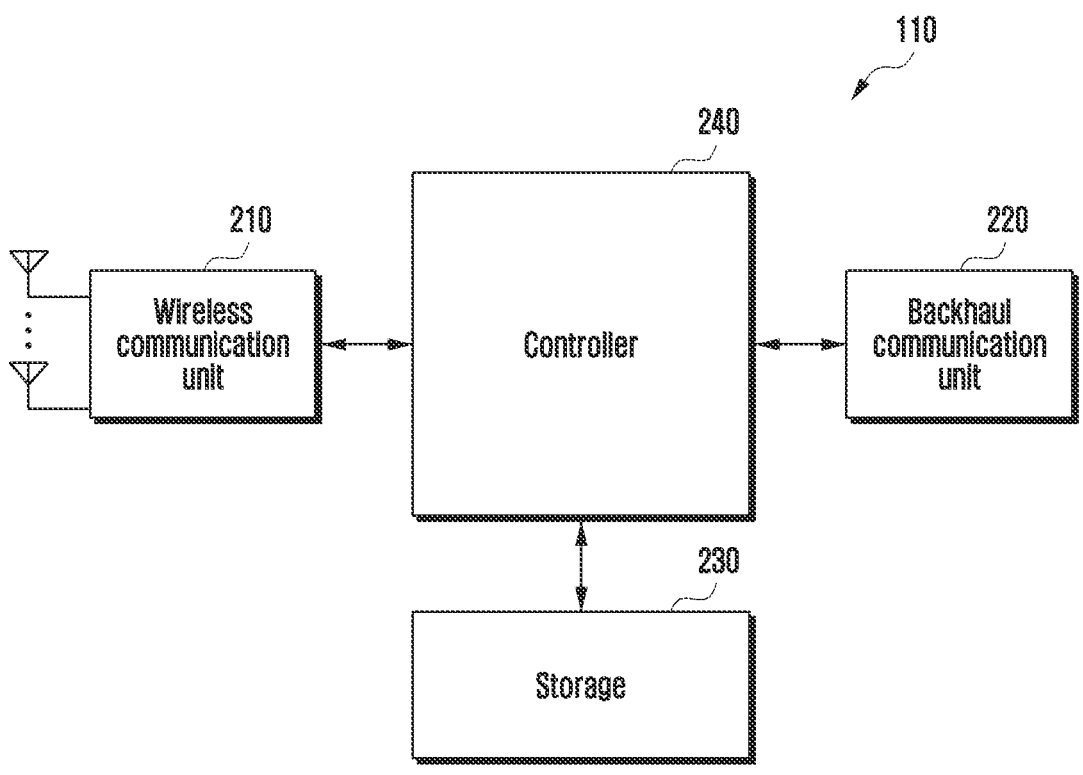
FIG. 2 is a diagram illustrating the constitution of a base station in a wireless communication system according to an embodiment of the disclosure.

FIG. 2 is a diagram illustrating the constitution of a base station in a wireless communication system according to an embodiment of the disclosure. The constitution shown in FIG. 2 may be understood as the constitution of the base station 110. Terms such as ' . . . unit', ' . . . er', etc. used hereinafter refer to a unit that processes at least one function or operation, and this may be implemented with hardware, software, or a combination of hardware and software.

With reference to FIG. 2, the base station 110 may include a wireless communication unit 210, a backhaul communication unit 220, a storage 230, and a controller 240. However, elements of the base station 110 are not limited to the above example. For example, the base station may include more or fewer elements than those described above. In addition, the wireless communication unit 210, the backhaul communication unit 220, the storage 230, and the controller 240 may be implemented in a single chip form. Also, the controller 240 may include one or more processors.

The wireless communication unit 210 may perform functions for transmitting and receiving signals through a radio channel. For example, the wireless communication unit 210 may perform a function of conversion between a baseband signal and a bit string in accordance with a physical layer standard of a system. For example, upon transmitting data, the wireless communication unit 210 may encode and modulate a transmission bit string and thereby generate complex symbols. Also, upon receiving data, the wireless communication unit 210 may restore a reception bit string through demodulation and decoding of a baseband signal.

In addition, the wireless communication unit 210 up-converts a baseband signal into a radio frequency (RF) band signal, transmits the RF band signal through an antenna, and down-converts an RF band signal received through the antenna into a baseband signal. To this end, the wireless communication unit 210 may include a transmission filter, a reception filter, an amplifier, a mixer, an oscillator, a digital to analog converter (DAC), an analog to digital converter (ADC), and the like. Further, the wireless communication unit 210 may include a plurality of transmission and reception paths. Also, the wireless communication unit 210 may include at least one antenna array composed of a plurality of antenna elements.

In terms of hardware, the wireless communication unit 210 may be composed of a digital unit and an analog unit, and the analog unit may be composed of a plurality of sub-units according to operating power, operating frequency, and the like. The digital unit may be implemented with at least one processor (e.g., digital signal processor (DSP)).

The wireless communication unit 210 transmits and receives signals as described above. Accordingly, all or part of the wireless communication unit 210 may be referred to as a 'transmitter', 'receiver', or 'transceiver'. Further, in the following description, transmission and reception performed through a radio channel are used in the meaning including the processing being performed as described above by the wireless communication unit 210.

The backhaul communication unit 220 may provide an interface for performing communication with other nodes in the network. That is, the backhaul communication unit 220 may convert a bit string transmitted from the base station to another node, for example, another access node, another base station, an upper node, the core network, and the like into a physical signal, and convert a physical signal received from any other node to a bit string.

The storage 230 may store a default program for the operation of the base station, an application program, and data such as configuration information. The storage 230 may be composed of a volatile memory, a non-volatile memory, or a combination thereof. Further, the storage 230 may provide the stored data in response to the request of the controller 240.

The controller 240 may control the overall operations of the base station. For example, the controller 240 may transmit and receive a signal through the wireless communication unit 210 or the backhaul communication unit 220. In addition, the controller 240 writes and reads data in the storage 230. Further, the controller 240 may perform functions of a protocol stack required in the communication standard. According to another implementation example, the protocol stack may be included in the wireless communication unit 210. To this end, the controller 240 may include at least one processor. According to various embodiments, the controller 240 may control the base station to perform operations according to various embodiments to be described later.

Figure 3:
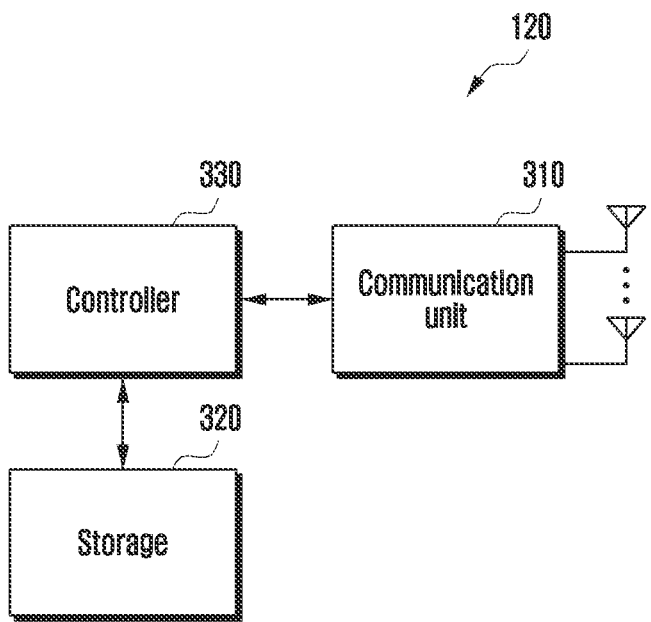
FIG. 3 is a diagram illustrating the constitution of a UE in a wireless communication system according to an embodiment of the disclosure.

FIG. 3 is a diagram illustrating the constitution of a UE 120 or 130 (hereinafter, indicated by 120) in a wireless communication system according to an embodiment of the disclosure.

The constitution shown in FIG. 3 may be understood as the constitution of the UE 120. Terms such as ' . . . unit', ' . . . er', etc. used hereinafter refer to a unit that processes at least one function or operation, and this may be implemented into hardware or software, or a combination of hardware and software.

With reference to FIG. 3, the UE 120 may include a communication unit 310, a storage 320, and a controller 330. However, elements of the UE 120 are not limited to the above example. For example, the UE 120 may include more or fewer elements than those described above. In addition, the communication unit 310, the storage 320, and the controller 330 may be implemented in a single chip form. Also, the controller 330 may include one or more processors.

The communication unit 310 performs functions for transmitting and receiving signals through a radio channel. For example, the communication unit 310 may perform a function of conversion between a baseband signal and a bit string in accordance with a physical layer standard of a system. For example, when transmitting data, the communication unit 310 encodes and modulates a transmission bit string and thereby generates complex symbols. Also, when receiving data, the communication unit 310 restores a reception bit string through demodulation and decoding of a baseband signal. Further, the communication unit 310 up-converts a baseband signal into an RF band signal, transmits the RF band signal through an antenna, and down-converts an RF band signal received through the antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission and reception paths. Also, the communication unit 310 may include at least one antenna array composed of a plurality of antenna elements. In terms of hardware, the communication unit 310 may be composed of a digital circuit and an analog circuit (e.g., radio frequency integrated circuit (RFIC)). Here, the digital circuit and the analog circuit may be implemented into one package. In addition, the communication unit 310 may include a plurality of RF chains. Also, the communication unit 310 may perform beamforming.

The communication unit 310 may transmit and receive signals as described above. Accordingly, all or part of the communication unit 310 may be referred to as a 'transmitter', 'receiver', or 'transceiver'. Further, in the following description, transmission and reception performed through a radio channel are used in the meaning including the processing being performed as described above by the communication unit 310.

The storage 320 may store a default program for the operation of the UE, an application program, and data such as configuration information. The storage 320 may be composed of a volatile memory, a non-volatile memory, or a combination thereof. Further, the storage 320 provides the stored data in response to the request of the controller 330.

The controller 330 controls the overall operations of the UE. For example, the controller 330 may transmit and receive a signal through the communication unit 310. In addition, the controller 330 writes and reads data in the storage 320. Further, the controller 330 may perform functions of a protocol stack required in the communication standard. To this end, the controller 330 may include at least one processor or microprocessor or may be a part of the processor. Further, a part of the communication unit 310 and the controller 330 may be referred to as a communication processor (CP). According to various embodiments, the controller 330 may control the UE to perform operations according to various embodiments to be described later.

Figure 4:
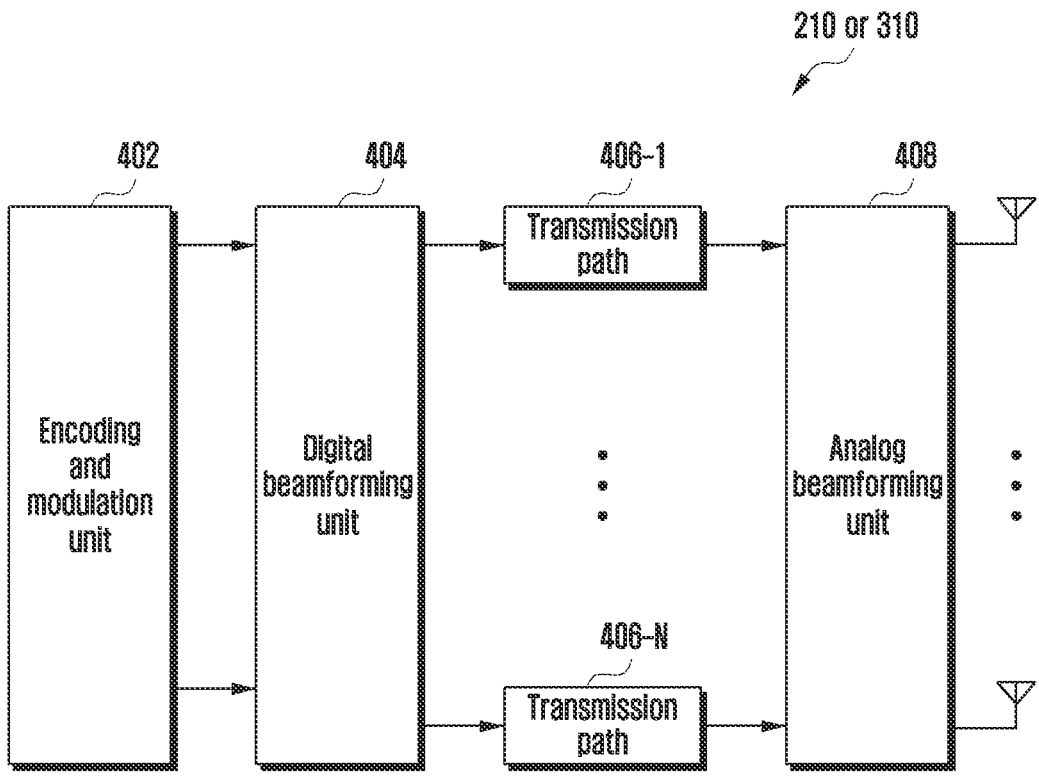
FIG. 4 is a diagram illustrating the constitution of a communication unit in a wireless communication system according to an embodiment of the disclosure.

FIG. 4 is a diagram illustrating the constitution of a communication unit in a wireless communication system according to an embodiment of the disclosure.

FIG. 4 illustrates an example of a detailed constitution of the wireless communication unit 210 of FIG. 2 or the communication unit 310 of FIG. 3. Specifically, FIG. 4 illustrates elements for performing beamforming as a part of the wireless communication unit 210 of FIG. 2 or the communication unit 310 of FIG. 3.

With reference to FIG. 4, the wireless communication unit 210 or the communication unit 310 may include an encoding and modulation unit 402, a digital beamforming unit 404, a plurality of transmission paths 406-1 to 406-N, and an analog beamforming unit 408.

The encoding and modulation unit 402 may perform channel encoding. For channel encoding, at least one of a low density parity check (LDPC) code, a convolution code, or a polar code may be used. The encoding and modulation unit 402 may perform constellation mapping and thereby generate modulation symbols.

The digital beamforming unit 404 may perform beamforming on a digital signal (e.g., modulation symbols). To this end, the digital beamforming unit 404 multiplies modulation symbols by beamforming weights. Here, the beamforming weights are used for changing the magnitude and phase of a signal, and may be referred to as a 'precoding matrix', a 'precode', or the like. The digital beamforming unit 404 may output digital-beamformed modulation symbols to a plurality of transmission paths 406-1 to 406-N. In this case, depending on a multiple input multiple output (MIMO) transmission technique, modulation symbols may be multiplexed or the same modulation symbols may be provided to the plurality of transmission paths 406-1 to 406-N.

The plurality of transmission paths 406-1 to 406-N may convert digital-beamformed digital signals into analog signals. To this end, each of the plurality of transmission paths 406-1 to 406-N may include an inverse fast Fourier transform (IFFT) operation unit, a cyclic prefix (CP) insertion unit, a DAC, and an up-conversion unit. The CP insertion unit is for an orthogonal frequency division multiplexing (OFDM) scheme and may be excluded in the case that any other physical layer scheme (e.g., filter bank multi-carrier (FBMC)) is applied. That is, the plurality of transmission paths 406-1 to 406-N may provide independent signal processing processes for a plurality of streams generated through digital beamforming. However, depending on implementation types, some of elements of the plurality of transmission paths 406-1 to 406-N may be used in common.

The analog beamforming unit 408 may perform beamforming on an analog signal. To this end, the digital beamforming unit 404 may multiply the analog signals by beamforming weights. Here, the beamforming weights are used for changing the magnitude and phase of the signal. Specifically, the analog beamforming unit 408 may be variously configured depending on a connection structure between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array or connected to two or more antenna arrays.

Figure 5:
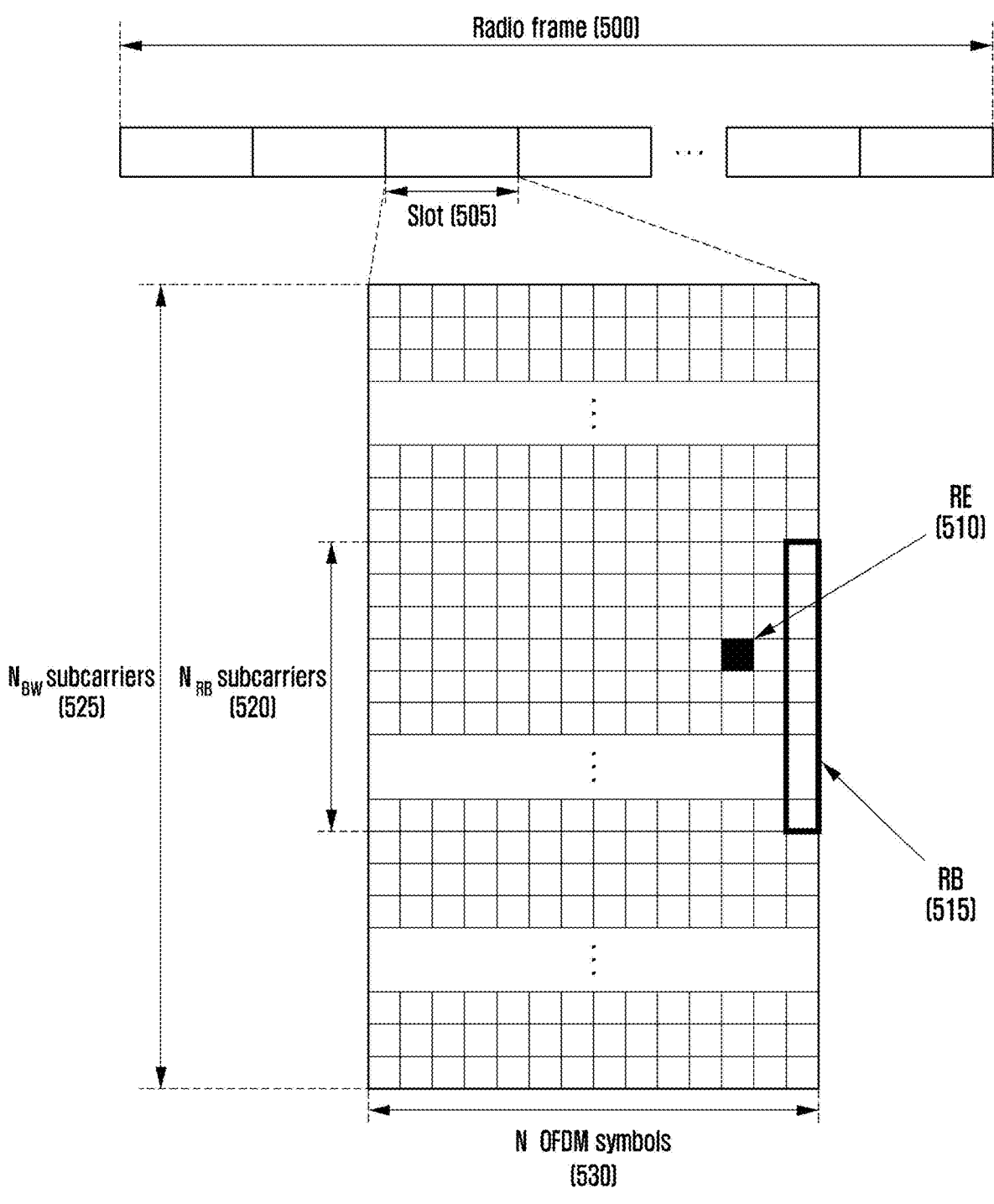
FIG. 5 is a diagram illustrating the structure of a radio time-frequency resource in a wireless communication system according to an embodiment of the disclosure.

FIG. 5 is a diagram illustrating the structure of a radio time-frequency resource in a wireless communication system according to an embodiment of the disclosure.

With reference to FIG. 5, the horizontal axis represents the time domain and the vertical axis represents the frequency domain in the radio resource domain. The minimum transmission unit in the time domain is an OFDM symbol or a DFT-S-OFDM symbol, and $N_{symb}$ OFDM symbols or DFT-S-OFDM symbols 530 may be contained in one slot 505. Unlike the slot, in the NR system, the length of a subframe may be defined as 1.0 ms, and the length of a radio frame 500 may be defined as 10 ms. The minimum transmission unit in the frequency domain is a subcarrier, and the bandwidth of the entire system transmission bandwidth may include a total of $N_{BW}$ subcarriers 525. Specific values such as $N_{symb}$ and $N_{BW}$ may be applied variably depending on the system.

A basic unit of the time-frequency resource domain is a resource element (RE) 510, which may be represented by an OFDM symbol index or a DFT-S-OFDM symbol index and a subcarrier index. A resource block (RB) 515 may be defined as $N_{RB}$ consecutive subcarriers 520 in the frequency domain. In general, the minimum transmission unit of data is an RB unit, and in the NR system, $N_{symb}$ is 14 and $N_{RB}$ is 12.

The radio time-frequency resource structure as shown in FIG. 5 is applied to the Uu interface. In addition, the radio time-frequency resource allocation as shown in FIG. 5 may be similarly applied to the sidelink.

Figure 6A:
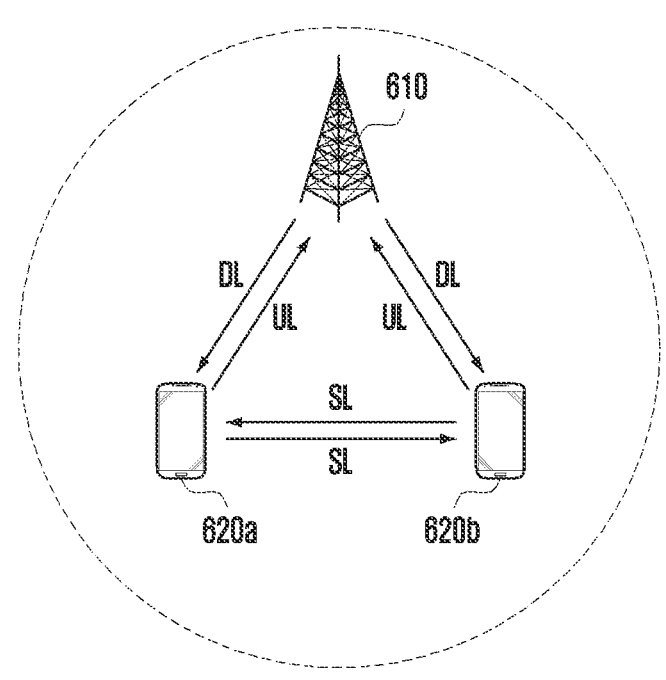
FIG. 6A is a diagram illustrating a scenario for sidelink communication according to an embodiment of the disclosure.

FIG. 6A is a diagram illustrating a scenario for sidelink communication according to an embodiment of the disclosure.

FIG. 6A exemplarily shows an in-coverage scenario in which sidelink UEs 620a and 620b are located within the coverage of a base station 610. The sidelink UEs 620a and 620b are capable of receiving data and control information from the base station 610 through a downlink (DL) or transmitting data and control information to the base station 610 through an uplink (UL). These data and control information may be those for sidelink communication or those for general cellular communication other than the sidelink communication. In addition, the sidelink UEs 620a and 620b are capable of transmitting/receiving data and control information for sidelink communication through a sidelink.

Figure 6B:
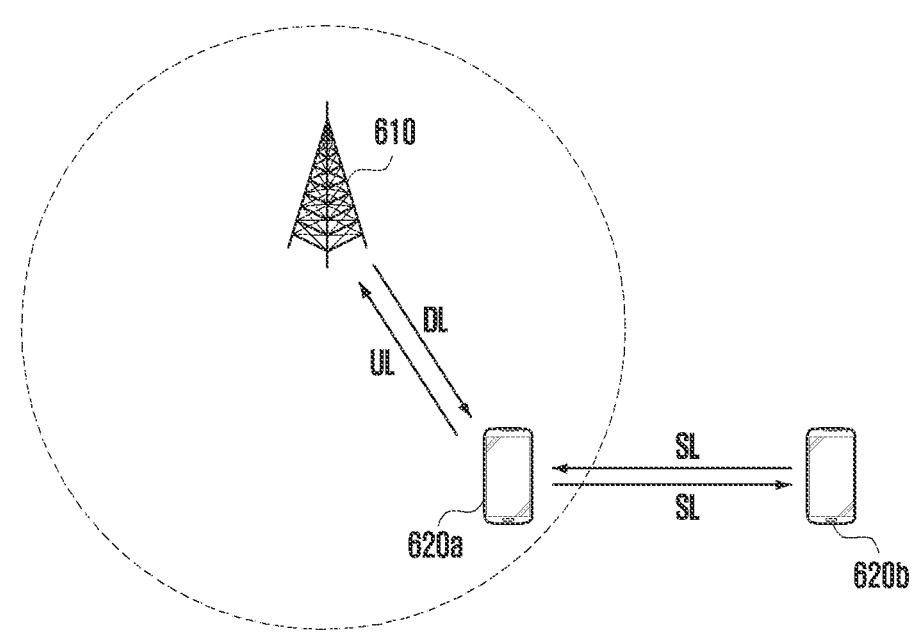
FIG. 6B is a diagram illustrating a scenario for sidelink communication according to an embodiment of the disclosure.

FIG. 6B is a diagram illustrating a scenario for sidelink communication according to an embodiment of the disclosure.

FIG. 6B exemplarily shows a partial coverage scenario in which, among sidelink UEs, a first UE 620a is located within the coverage of the base station 610 and a second UE 620b is located outside the coverage of the base station 610. The first UE 620a located within the coverage of the base station 610 is capable of receiving data and control information from the base station 610 through the downlink or transmitting data and control information to the base station 610 through the uplink. The second UE 620b located out of the coverage of the base station 610 is incapable of receiving data and control information from the base station 610 through the downlink and incapable of transmitting data and control information to the base station 610 through the uplink. The second UE 620b is capable of transmitting/receiving data and control information for sidelink communication to/from the first UE 620a through the sidelink.

Figure 6C:
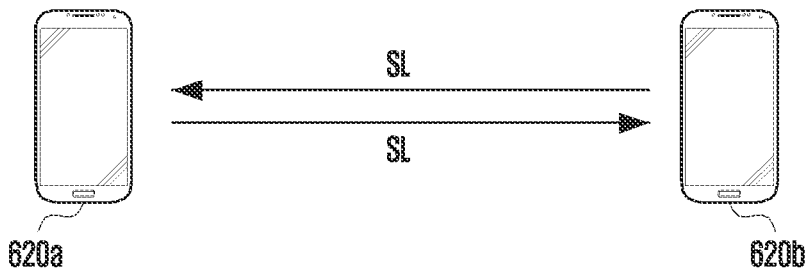
FIG. 6C is a diagram illustrating a scenario for sidelink communication according to an embodiment of the disclosure.

FIG. 6C is a diagram illustrating a scenario for sidelink communication according to an embodiment of the disclosure.

FIG. 6C shows an out-of-coverage scenario in which sidelink UEs (e.g., a first UE 620a and a second UE 620b) are located out of the coverage of the base station. Therefore, the first UE 620a and the second UE 620b are incapable of receiving data and control information from the base station through the downlink and incapable of transmitting data and control information to the base station through the uplink. The first UE 620a and the second UE 620b are capable of transmitting/receiving data and control information for sidelink communication through the sidelink.

Figure 6D:
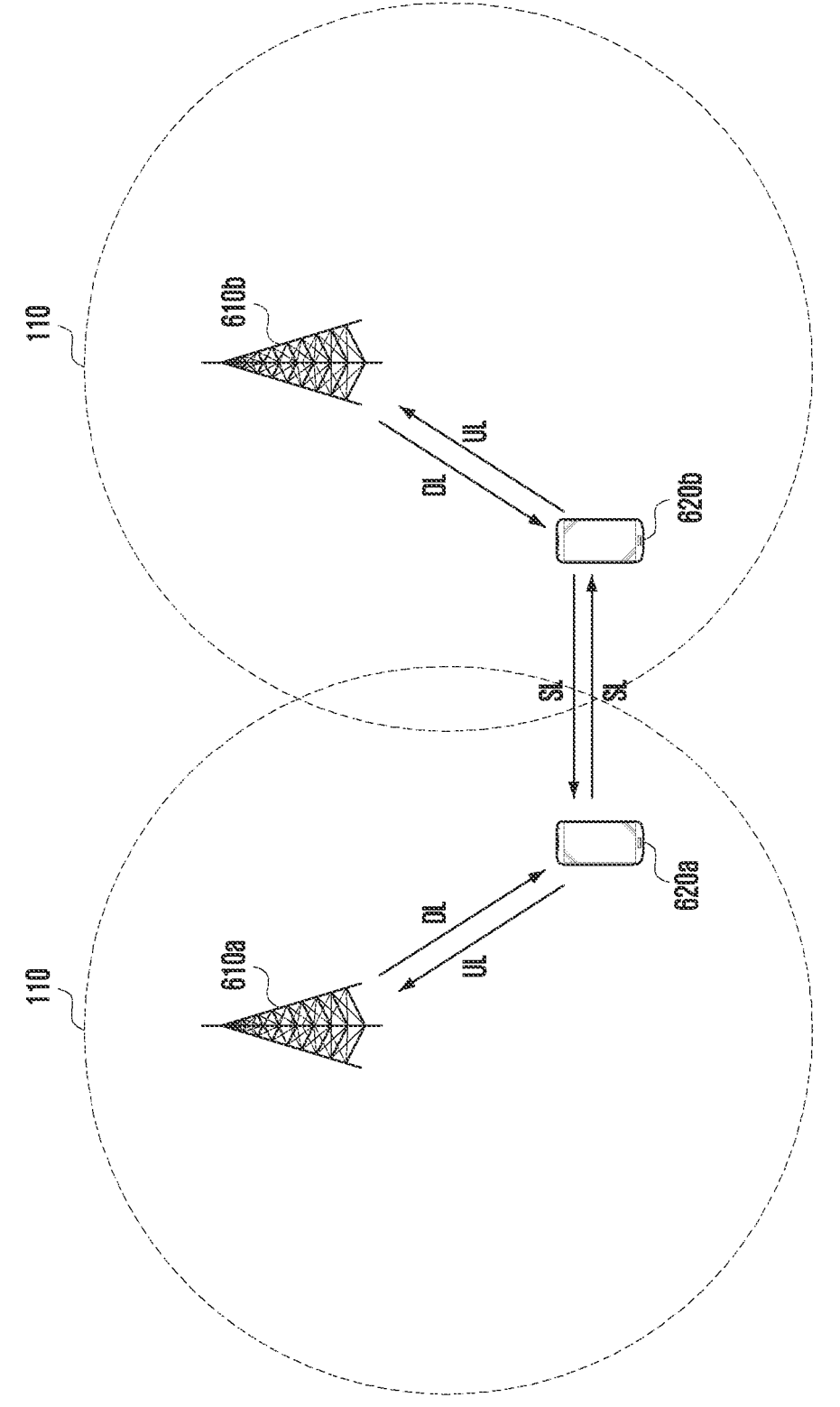
FIG. 6D is a diagram illustrating a scenario for sidelink communication according to an embodiment of the disclosure.

FIG. 6D is a diagram illustrating a scenario for sidelink communication according to an embodiment of the disclosure.

With reference to FIG. 6D, a first UE 620a and a second UE 620b performing sidelink communication may perform inter-cell sidelink communication in an access state (e.g., RRC connected state) or camping state (e.g., RRC connection release state, i.e., an RRC idle state) with different base stations (e.g., a first base station 610a and a second base station 610b). In this case, the first UE 620a may be a sidelink transmitting UE, and the second UE 620b may be a sidelink receiving UE. Alternatively, the first UE 620a may be a sidelink receiving UE, and the second UE 620b may be a sidelink transmitting UE. The first UE 620a may receive a system information block (SIB) dedicated to sidelink from the base station 610b which the first UE 620a is connected to (or is camping on), and the second UE 620b may receive the SIB dedicated to sidelink from another base station 610b which the second UE 620b is connected to (is camping on). In this case, information of the sidelink-dedicated SIB received by the first UE 620a and information of the sidelink-dedicated SIB received by the second UE 620b may be different from each other. Therefore, to enable sidelink communication between UEs located in different cells, information needs to be unified.

Although FIGS. 6A to 6D illustrate a sidelink system composed of two UEs (e.g., the first UE 620a and the second UE 620b) for convenience of description, the disclosure is not limited to the above and this may also be applied to a sidelink system in which two or more UEs participate. In addition, the uplink and downlink between the base station 610, 610a, or 610b and the sidelink UE 620a or 620b may be referred to as a Uu interface, and the sidelink between the sidelink UEs may be referred to as a PC-5 interface. In the following description, the uplink or downlink and the Uu interface may be used interchangeably, and the sidelink and the PC-5 interface may be used interchangeably.

Meanwhile, in the disclosure, the UE may refer to a vehicle that supports vehicle-to-vehicle (V2V) communication, a vehicle or a pedestrian's handset (e.g., a smartphone) that supports vehicle-to-pedestrian (V2P) communication, a vehicle that supports vehicle-to-network (V2N) communication, or a vehicle that supports vehicle-to-infrastructure (V2I) communication. In addition, in the disclosure, the UE may refer to a road side unit (RSU) having a UE function, an RSU having a base station function, or an RSU having a part of the base station function and a part of the UE function.

Figure 7A:
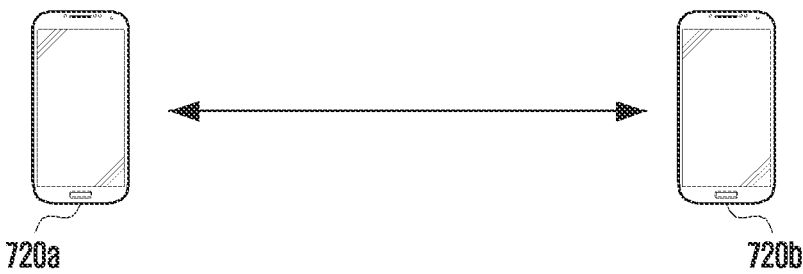
FIG. 7A is a diagram illustrating a transmission scheme of sidelink communication according to an embodiment of the disclosure.
Figure 7B:
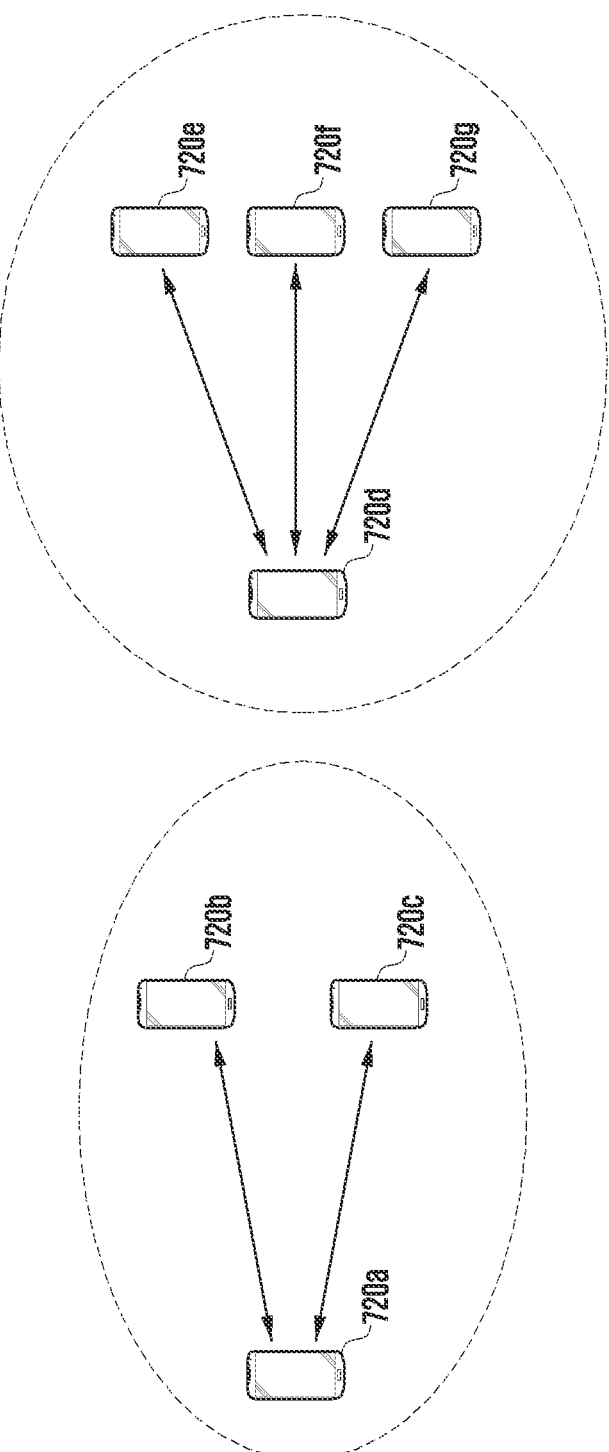
FIG. 7B is a diagram illustrating a transmission scheme of sidelink communication according to an embodiment of the disclosure.

FIGS. 7A and 7B are diagrams illustrating a transmission scheme of sidelink communication according to an embodiment of the disclosure.

Specifically, FIG. 7A shows a unicast scheme, and FIG. 7B shows a groupcast scheme.

With reference to FIG. 7A, a transmitting UE 720a and a receiving UE 720b may perform one-to-one communication. The transmission scheme of FIG. 7A may be referred to as unicast communication. With reference to FIG. 7B, a transmitting UE 720a or 720d and receiving UEs 720b, 720c, 720e, 702f, and 720g may perform one-to-many communication. The transmission scheme of FIG. 7B may be referred to as groupcast or multicast communication. In FIG. 7B, a first UE 720a, a second UE 720b, and a third UE 720c may form one group (group A) and perform groupcast communication, and a fourth UE 720d, a fifth UE 720e, a sixth UE 720f, and a seventh UE 720g may form another group (group B) and perform groupcast communication. Each UE may perform groupcast communication within a group to which it belongs, and may perform unicast, groupcast, or broadcast communication with at least one UE belonging to any other group. Although two groups are illustrated in FIG. 7B for convenience of description, the disclosure is not limited to this and may also be applied to even the case where a larger number of groups are formed.

On the other hand, although not shown in FIGS. 7A and 7B, sidelink UEs may perform broadcast communication. The broadcast communication refers to a scheme in which all sidelink UEs receive data and control information transmitted by a sidelink transmitting UE through a sidelink. For example, if the first UE 720a is a transmitting UE in FIG. 7B, the remaining UEs 720b, 720c, 720d, 720e, 720f, and 720g may receive data and control information transmitted by the first UE 720a.

The above-described sidelink unicast communication, groupcast communication, and broadcast communication may be supported in the in-coverage scenario, partial-coverage scenario, or out-of-coverage scenario.

In the case of the NR sidelink, unlike the LTE sidelink, it may be considered to support a transmission form in which a vehicle UE transmits data to only one specific UE through unicast and a transmission form in which a vehicle UE transmits data to a plurality of specific UEs through groupcast. For example, in the case of considering a service scenario such as platooning, which is a technology in which two or more vehicles are connected into one network and moved in a cluster form, these unicast and groupcast technologies can be usefully used. Specifically, a leader UE of a group connected by platooning can use unicast communication for the purpose of controlling one specific UE and use groupcast communication for the purpose of simultaneously controlling a group composed of a plurality of specific UEs.

In the V2X system, the following methods may be used for resource allocation.

(1) Mode 1 Resource Allocation

Scheduled resource allocation is a method in which the base station allocates resources used for sidelink transmission to RRC-connected UEs in a dedicated scheduling scheme. The scheduled resource allocation method may be effective for interference management and resource pool management (dynamic allocation and/or semi-persistent transmission) because the base station can manage sidelink resources. In the case where there is data to be transmitted to other UE(s), the UE in the RRC connection mode may transmit, to the base station by using an RRC message or a MAC control element (CE), information notifying that there is data to be transmitted to other UE(s). For example, the RRC message transmitted by the UE to the base station may be a sidelink UE information message, a UE assistance information message, etc., and the MAC CE may correspond to a BSR MAC CE including at least one of an indicator indicating a buffer status report (BSR) for V2X communication and information on the size of buffered data for sidelink communication, a scheduling request (SR), or the like.

(2) Mode 2 Resource Allocation

Second, UE autonomous resource selection is a method in which a sidelink transmission and reception resource pool for V2X is provided to the UE via system information or RRC messages (e.g., an RRC reconfiguration message, a PC5-RRC message) and the UE selects a resource pool and resources in accordance with a predetermined rule. The UE autonomous resource selection may correspond to one or more of the following resource allocation methods.

The UE autonomously selects sidelink resource for transmission.

The UE assists sidelink resource selection for other UEs.

The UE is configured with NR configured grant for sidelink transmission.

The UE schedules sidelink transmission of other UEs.

Resource selection methods of the UE may include zone mapping, sensing-based resource selection, random selection, and the like.

In addition, even if the UE exists in the coverage of the base station, resource allocation or resource selection may not be performed in the scheduled resource allocation or UE autonomous resource selection mode. In this case, the UE may perform V2X sidelink communication in a UE random selection scheme through a preconfigured exceptional sidelink transmission and reception resource pool.

Also, in the case that UEs for V2X communication exist outside the coverage of the base station, the UE may perform V2X sidelink communication through a preconfigured sidelink transmission and reception resource pool.

In the case that the UE transmits and receives sidelink-based data, the sidelink-based data may be transmitted in a broadcast scheme or a groupcast scheme. In the case that the UE transmits and receives sidelink-based data in a unicast scheme, PC5-S signaling (e.g., sidelink (SL) unicast connection setup message) transmitted until a PC5 unicast connection between two UEs is established may be transmitted in a broadcast scheme. The disclosure will describe, through various embodiments, a scheme of processing sidelink DRX in the case where one UE transmits sidelink signaling to one or more UEs in a broadcast scheme, a groupcast scheme, or a unicast scheme.

Figure 8:
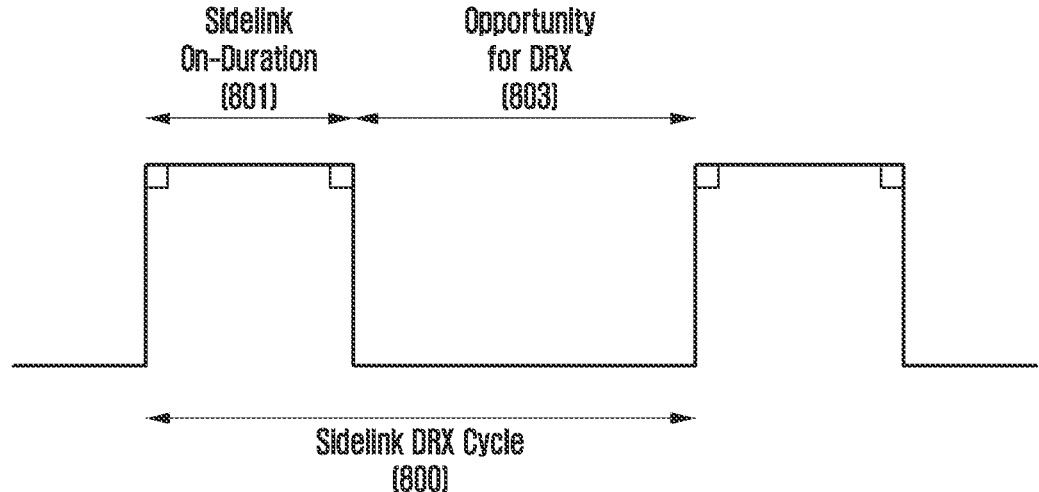
FIG. 8 is a diagram illustrating the constitution of a sidelink DRX cycle according to an embodiment of the disclosure.

FIG. 8 is a diagram illustrating the constitution of a sidelink DRX cycle according to an embodiment of the disclosure.

With reference to FIG. 8, a sidelink DRX cycle 800 may be composed of an on-duration 801 and a DRX opportunity 803. In the case that sidelink DRX is configured, the UE may monitor a reception resource pool in the on-duration 801. The UE may not monitor a reception resource pool in the DRX opportunity 803. In the case that sidelink DRX is configured, the transmitting UE may transmit sidelink control information and data through transmission resources acquired from a transmission resource pool in the on-duration 801. When sidelink DRX is configured, the UE may acquire sidelink DRX configuration information including at least one of information on the sidelink DRX cycle 800, information on the on-duration 801, and information on the DRX opportunity 803. The UE may acquire the sidelink DRX configuration information from a network (NW) (through an RRC dedicated message or a system information message) or from preconfigured information. The NW may be at least one entity (or function) of a core network (CN) or may be a base station (RAN), and it is not limited to the above example and may include all entities other than the UE supporting sidelink communication. The UEs performing sidelink unicast-based communication may acquire the sidelink DRX configuration information including at least one of information on the sidelink DRX cycle 800, information on the on-duration 801, and information on the DRX opportunity 803 through PC5-RRC connection establishment signaling.

In the case that sidelink DRX is configured, sidelink DRX parameters to be processed by the UE may be at least one or a combination of those listed in Table 1 below.

TABLE 1 on-duration: duration at the beginning of a DRX cycle
inactivity-timer: duration after the SCI occasion in which a SCI indicates a
new SL transmission for the MAC entity
retransmission-timer: maximum duration until a retransmission is received
(or maximum duration until a SL grant for retransmission is received)
cycle: specifies the periodic repetition of the on-duration followed by a
possible period of inactivity
active-time includes the time while on-duration or inactivity-timer or
retransmission-timer is running In the case that sidelink DRX is configured according to an embodiment of the disclosure, the transmitting UE may transmit a wake-up signal to the receiving UE for the purpose of instructing reception resource pool monitoring. The receiving UE may receive a sidelink control signal (e.g., sidelink control information, SCI) and data through a reception resource pool resource.

Next, a scheme of processing a wake-up signal in sidelink DRX will be described with reference to FIGS. 9A, 9B, 9C, 10A, 10B, and 10C.

According to an embodiment of the disclosure, a wake-up signal (WUS) may be transmitted through at least one of sidelink physical channels such as a physical sidelink control channel (PSCCH) and a physical sidelink shared channel (PSSCH).

The wake-up signal may indicate reception information of corresponding sidelink control information (SCI) and data. The reception information may include at least one or a combination of a destination identifier (one or more broadcast destination identifiers, one or more groupcast destination identifiers, or one or more unicast destination identifiers) and a reception resource pool. The sidelink resource of the wake-up signal may be composed of at least one or a combination of time, frequency, sequence, and period.

The sidelink resource of the wake-up signal may be configured for each transmission type (broadcast, groupcast, unicast). For example, in the case that the sidelink DRX is configured for the transmitting UE and the receiving UE connected by unicast, the transmitting UE and the receiving UE may exchange resources for transmitting and receiving the wake-up signal through sidelink unicast signaling. In the case that the sidelink DRX is configured for the transmitting UE and the receiving UE performing broadcast or groupcast, there is no sidelink unicast connection of exchanging information on resources for transmitting and receiving the wake-up signal between the transmitting UE and the receiving UE. Therefore, the sidelink resource of the wake-up signal of broadcast or groupcast may be preconfigured or provided by the system to provide the same information to the transmitting UE and the receiving UE.

The sidelink resource of the wake-up signal may be configured regardless of a transmission type. For example, in the case that the sidelink DRX is configured for the transmitting UE and the receiving UE performing unicast, groupcast, or broadcast, the sidelink resource of the wake-up signal may be preconfigured or provided by the system to provide the same information to the transmitting UE and the receiving UE.

A wake-up signal transmission resource may be acquired using a mode 1 resource allocation scheme (scheduling by the base station) or a mode 2 resource allocation scheme (scheduling by the UE). The wake-up signal transmission resource may be acquired when the sidelink DRX is configured. In the case of the mode 1 resource allocation scheme, the UE may acquire the wake-up signal transmission resource from the base station. The transmission resource may be acquired in a dynamic resource allocation scheme or a configured grant allocation scheme. In the case of the mode 2 resource allocation scheme, the UE may acquire the wake-up signal transmission resource based on sensing from among resources configured for the wake-up signal or may acquire the wake-up signal transmission resource by random selection.

In the case that several UEs should share and use the wake-up signal transmission resource, a scheme of selecting the wake-up signal transmission resource may be required to minimize transmission resource collision in the mode 2 resource allocation scheme. In this case, the wake-up signal transmission resource may be composed of sub-resources, and the UE may perform a modulation operation as a scheme of acquiring the sub-resources. The UE may acquire the wake-up signal transmission resource by applying destination identifier-based modulation among resources configured for the wake-up signal. The UE may acquire the wake-up signal transmission resource by applying DRX identifier-based modulation among resources configured for the wake-up signal. In the case that SL DRX is configured in the UE, the DRX identifier may be used as identification information used by the UE in the SL DRX operation. According to an embodiment, the DRX identifier may be used to distinguish at least one or a combination of a UE, a service of the UE, and a sidelink radio bearer configured for the UE during the SL DRX operation. The DRX identifier may be configured (via RRC dedicated or via system information) or pre-configured by the network to the UE. The DRX identifier may be configured through a PC5-RRC message, PC5-S signaling, or PC5 MAC CE exchanged between two UEs that transmit and receive data based on sidelink unicast. In the case of groupcast, the UE corresponding to a group leader may be configured to transmit the wake-up signal. In the case of groupcast, the UE corresponding to a group leader may be configured to acquire and transmit a DRX identifier.

Figure 9A:
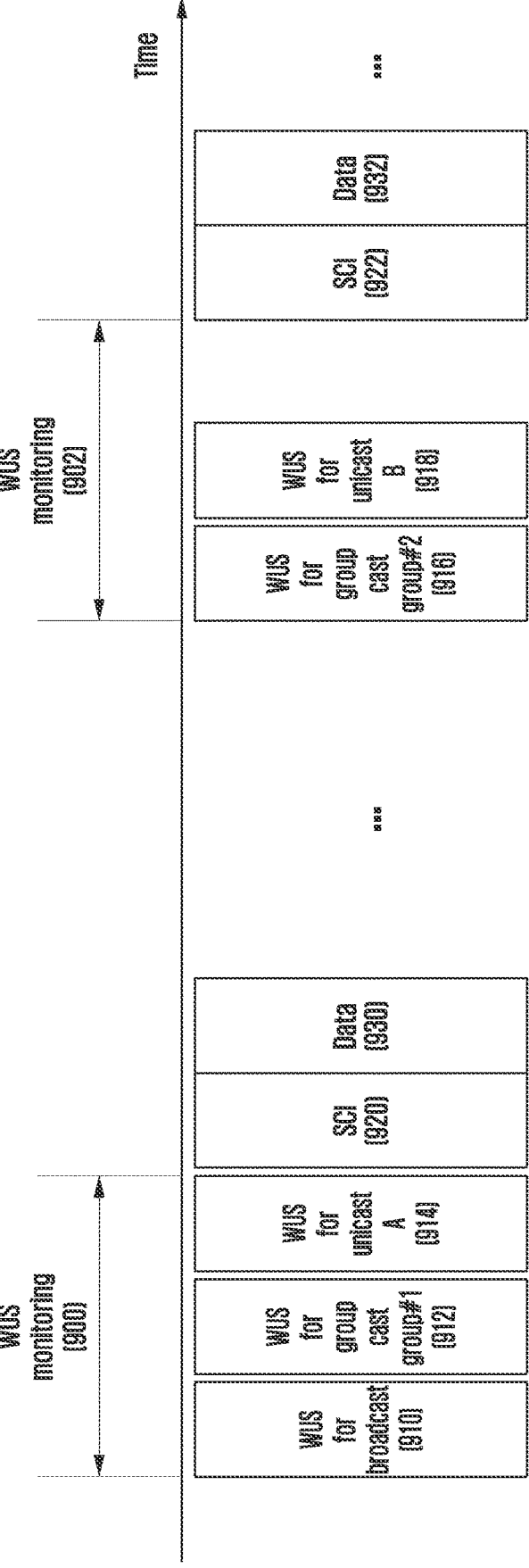
FIG. 9A is a diagram illustrating the constitution of a sidelink DRX wake-up signal (WUS) according to an embodiment of the disclosure.

FIG. 9A is a diagram illustrating the constitution of a sidelink DRX wake-up signal (WUS) according to an embodiment of the disclosure.

With reference to FIG. 9A, sidelink wake-up signal monitoring intervals 900 and 902 may correspond to resources for monitoring the sidelink wake-up signal by the receiving UE in which sidelink DRX is configured, and resources for transmitting the sidelink wake-up signal by the transmitting UE in which sidelink DRX is configured. The sidelink wake-up signal monitoring intervals may be operated for each sidelink reception resource pool. The sidelink reception resource pool may be configured to monitor at least one of broadcast, groupcast, and unicast. At least one sidelink reception resource pool may be configured, and a destination identifier or a DRX identifier corresponding to each reception resource pool may be configured or preconfigured to the UE through the NW. If there is no separate configuration information, the UE may determine that the sidelink reception resource pool corresponds to all destination identifiers or all DRX identifiers.

FIG. 9A is a diagram showing an example of operating the wake-up signal monitoring intervals 900 and 902 for reception resource pools corresponding to a broadcast wake-up signal 910, a groupcast #1 wake-up signal 912, a unicast A wake-up signal 914, a groupcast #2 wake-up signal 916, and a unicast B wake-up signal 918.

According to the example of FIG. 9A, the first wake-up signal monitoring interval 900 may transmit the broadcast wake-up signal 910, the groupcast #1 wake-up signal 912, and the unicast A wake-up signal 914, and the UE receiving them may determine that data corresponding to broadcast, groupcast #1, and unicast A exist. The second wake-up signal monitoring interval 902 may transmit the groupcast #2 wake-up signal 916 and the unicast B wake-up signal 918, and the UE receiving them may determine that data corresponding to groupcast #2 and unicast B exist. Here, the receiving UE may be configured to monitor whether at least one of the broadcast wake-up signal 910, the groupcast #1 wake-up signal 912, the unicast A wake-up signal 914, the groupcast #2 wake-up signal 916, and the unicast B wake-up signal 918 is transmitted in the wake-up signal monitoring intervals 900 and 902. The UE that is interested in at least one of the broadcast wake-up signal 910, the groupcast #1 wake-up signal 912, and the unicast A wake-up signal 914 in the first wake-up signal monitoring interval 900 may monitor the reception resource pool and receive a sidelink control signal 920 and data 930. The UE that is interested in at least one of the groupcast #2 wake-up signal 916 and the unicast B wake-up signal 918 in the second wake-up signal monitoring interval 902 may monitor the reception resource pool and receive a sidelink control signal 922 and data 932. Although FIG. 9A exemplarily shows the case where the wake-up signals are transmitted through separate sidelink resources, the wake-up signals may be transmitted in the same sidelink resource, and in this case, identification information for each wake-up signal may be included in the wake-up signal. For example, the identification information may be at least one or a combination of a destination identifier and a cast type.

Next, the operation of a receiving UE and the operation of a transmitting UE, which process a sidelink DRX wake-up signal, will be described with reference to FIGS. 9B and 9C, respectively.

Figure 9B:
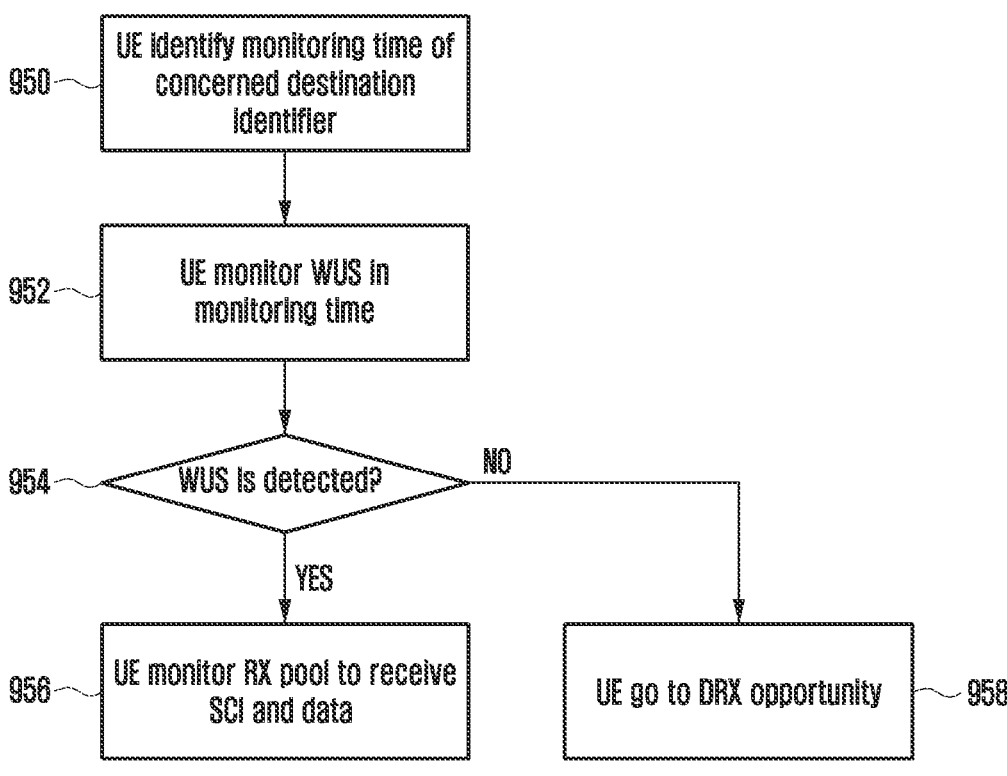
FIG. 9B is a diagram illustrating the operation of a UE processing a sidelink DRX WUS according to an embodiment of the disclosure.

FIG. 9B is a diagram illustrating the operation of a UE processing a sidelink DRX WUS according to an embodiment of the disclosure.

With reference to FIG. 9B, at step 950, the UE may determine a wake-up signal monitoring interval of an identifier corresponding to a service of interest, based on the configured wake-up signal monitoring interval and reception resource pool information. At step 952, the UE may monitor the wake-up signal monitoring interval and determine whether a wake-up signal is received. If it is determined at step 954 that a wake-up signal corresponding to at least one service of interest is received, at step 956 the UE may monitor the reception resource pool and perform an operation of receiving a sidelink control signal and data. If it is determined at step 954 that a wake-up signal corresponding to at least one service of interest is not received, at step 958 the UE may proceed to a DRX opportunity that does not require monitoring of the reception resource pool.

Figure 9C:
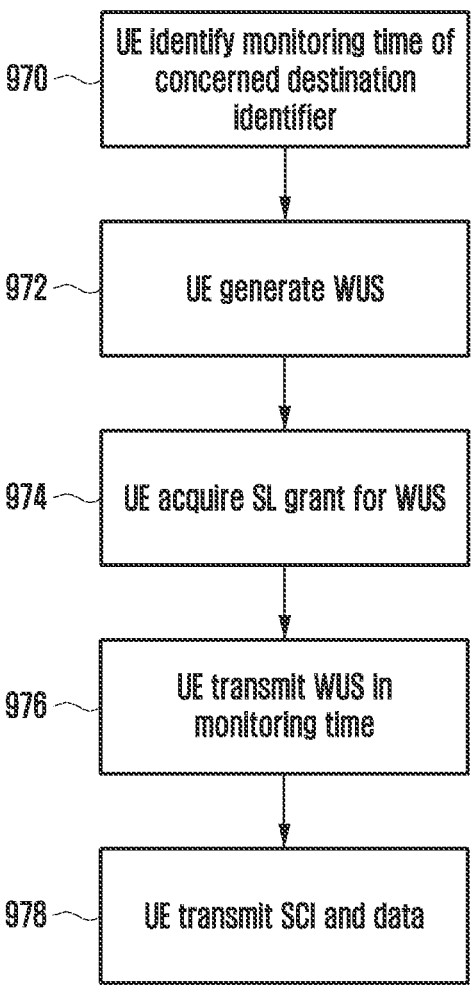
FIG. 9C is a diagram illustrating the operation of a UE processing a sidelink DRX WUS according to an embodiment of the disclosure.

FIG. 9C is a diagram illustrating the operation of a UE processing a sidelink DRX WUS according to an embodiment of the disclosure.

With reference to FIG. 9C, at step 970, the UE may determine a wake-up signal monitoring interval of an identifier corresponding to a service of interest, based on the configured wake-up signal monitoring interval and reception resource pool information. The UE may determine whether data to be transmitted for the service corresponding to the wake-up signal monitoring interval exists, and if data exists, the UE may generate a wake-up signal corresponding to the data at step 972. At step 974, the UE may acquire sidelink transmission resources for transmitting the wake-up signal in the wake-up signal monitoring interval. The UE may acquire a wake-up signal transmission resource from the base station or the UE may directly acquire it. At step 976, the UE may transmit the wake-up signal in the wake-up signal monitoring interval through the acquired transmission resource. At step 978, the UE may transmit a sidelink control signal regarding data transmission corresponding to the wake-up signal, and the data. The UE may acquire resources for transmitting the sidelink control signal and the data from the base station or by itself.

Figure 10A:
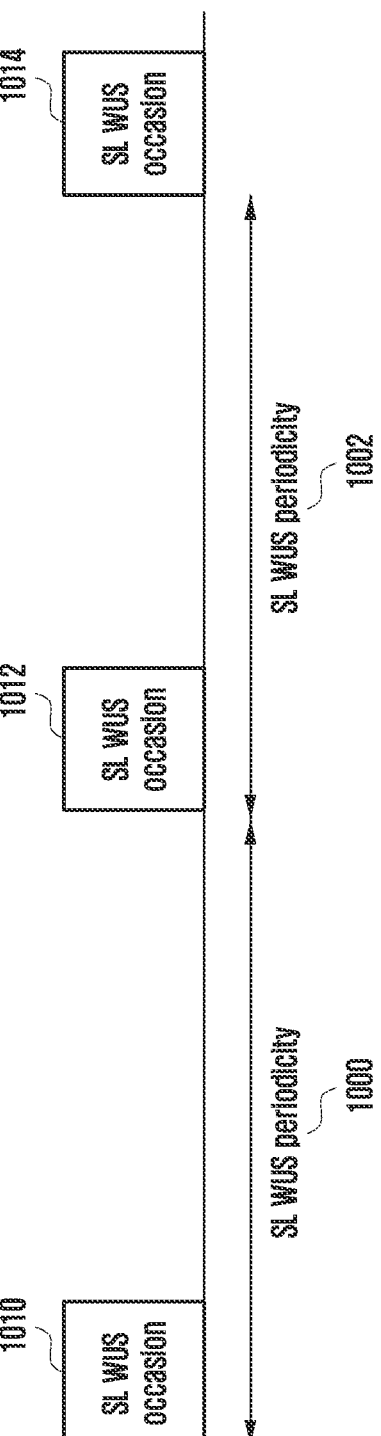
FIG. 10A is a diagram illustrating the constitution of a sidelink DRX WUS according to an embodiment of the disclosure.

FIG. 10A is a diagram illustrating the constitution of a sidelink DRX WUS according to an embodiment of the disclosure.

With reference to FIG. 10A, sidelink wake-up signal intervals (SL WUS occasions) 1010, 1012, and 1014 may be constructed for each sidelink wake-up signal period (SL WUS periodicity) 1000 or 1002. In the sidelink wake-up signal intervals 1010, 1012, and 1014, a wake-up signal may be transmitted through at least one or a combination of resources among time, frequency, sequence, and period. A sidelink channel through which the wake-up signal is transmitted may correspond to a physical channel, such as PSSCH or PSCCH, configured for sidelink use. The sidelink wake-up signal intervals 1010, 1012, and 1014 may be constructed separately for each broadcast connection, each groupcast connection, and each unicast connection. The receiving UE may monitor the sidelink wake-up signal in the sidelink wake-up signal intervals 1010, 1012, and 1014 corresponding to the connection of interest, and the transmitting UE may transmit the sidelink wake-up signal in the sidelink wake-up signal intervals 1010, 1012, and 1014 corresponding to the connection of interest. For each broadcast connection, each groupcast connection, and each unicast connection, based on a reception resource pool and mapping information, the receiving UE may monitor the corresponding reception resource pool for the connection where the sidelink wake-up signal is received, and receive a sidelink control signal and data. If the reception resource pool and mapping information are not separately configured for each broadcast connection, each groupcast connection, and each unicast connection, the receiving UE may monitor all reception resource pools upon receiving the sidelink wake-up signal and receive the sidelink control signal and data. According to an embodiment, the sidelink wake-up signal may indicate the corresponding reception resource pool information, and the receiving UE may monitor the reception resource pool indicated by the sidelink wake-up signal and receive the sidelink control signal and data.

Next, the operation of a receiving UE and the operation of a transmitting UE, which process a sidelink DRX wake-up signal, will be described with reference to FIGS. 10B and 10C, respectively.

Figure 10B:
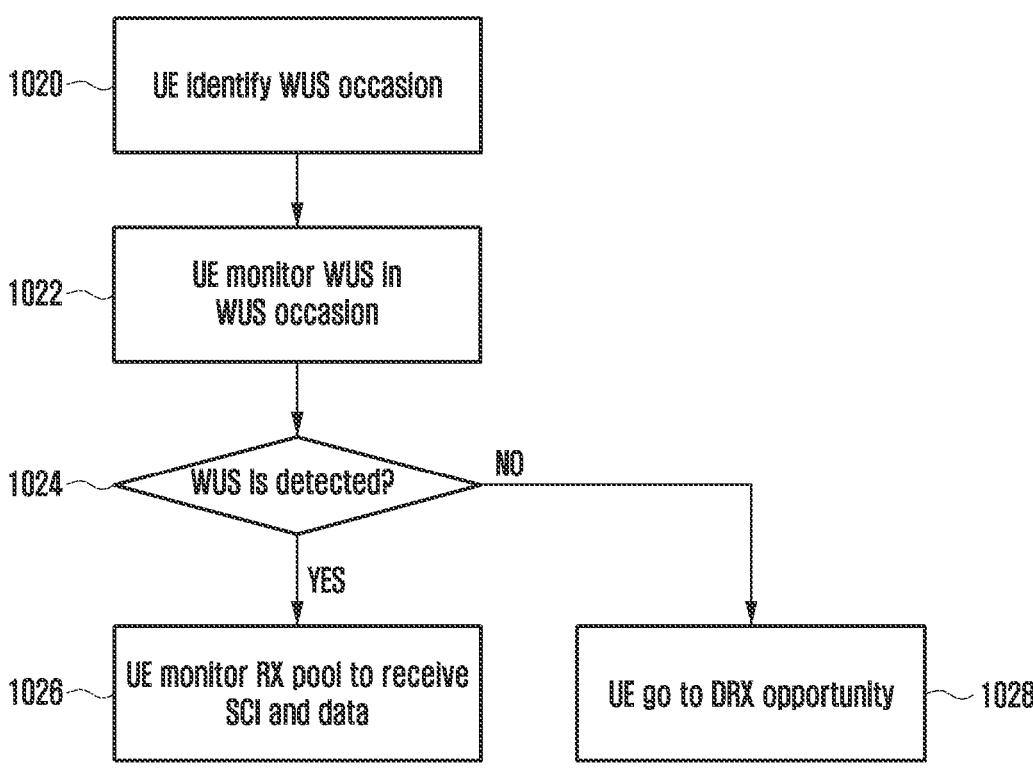
FIG. 10B is a diagram illustrating the operation of a UE processing a sidelink DRX WUS according to an embodiment of the disclosure.

FIG. 10B is a diagram illustrating the operation of a UE processing a sidelink DRX WUS according to an embodiment of the disclosure.

With reference to FIG. 10B, at step 1020, the UE may determine a wake-up signal interval based on wake-up signal interval configuration information. The wake-up signal interval configuration information may correspond to information acquired by the UE from the network or pre-configured in the UE. The wake-up signal interval information may be configured through PC5 RRC signaling between a transmitting UE and a receiving UE in which sidelink unicast connection is configured. At step 1022, the UE may monitor a wake-up signal in a wake-up signal interval. At step 1024, the UE may determine whether the wake-up signal is received. When it is determined that the wake-up signal is received or the wake-up signal for a service and connection of interest is received, at step 1026 the UE may monitor a reception resource pool and receive a sidelink control signal and data. At the step 1026, the UE may perform an operation of monitoring all reception resource pools, monitoring a reception resource pool indicated by the wake-up signal, or monitoring a reception resource pool corresponding to a service or connection of interest. If it is determined at the step 1024 that the wake-up signal is not received, at step 1028 the UE may perform an operation corresponding to a DRX opportunity that does not require monitoring of the reception resource pool.

Figure 10C:
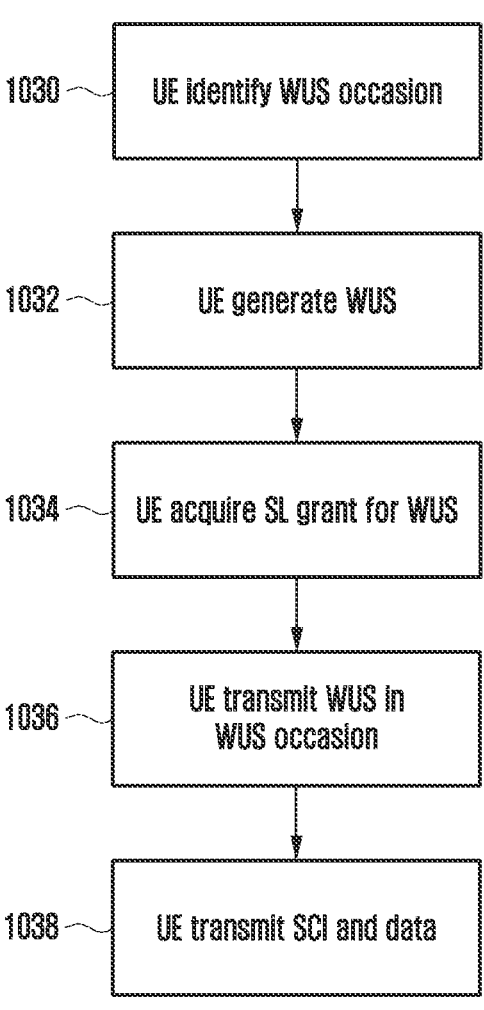
FIG. 10C is a diagram illustrating the operation of a UE processing a sidelink DRX WUS according to an embodiment of the disclosure.

FIG. 10C is a diagram illustrating the operation of a UE processing a sidelink DRX WUS according to an embodiment of the disclosure.

With reference to FIG. 10C, at step 1030, the UE may determine a wake-up signal interval based on wake-up signal interval configuration information. The wake-up signal interval configuration information may correspond to information acquired by the UE from the network or pre-configured in the UE. The wake-up signal interval information may be configured through PC5 RRC signaling between a transmitting UE and a receiving UE in which sidelink unicast connection is configured. When determining to transmit a wake-up signal in a wake-up signal interval, for example, when there is data to be transmitted by the UE, the UE may generate the wake-up signal at step 1032. At step 1034, the UE may acquire sidelink resources for transmitting the wake-up signal in the wake-up signal interval. The sidelink resources may be acquired from the base station or by itself. At step 1036, the UE may transmit the wake-up signal using the sidelink resources acquired in the wake-up signal interval. In order to transmit data of a service and connection corresponding to the wake-up signal, at step 1038 the UE may acquire sidelink transmission resources and transmit a sidelink control signal and data.

In an embodiment for configuring the sidelink wake-up signal interval, the same sidelink wake-up signal interval may be used for all sidelink connections (each broadcast, each groupcast, and each unicast). In this case, the sidelink wake-up signal may indicate identification information (e.g., a destination identifier of broadcast, groupcast or unicast, a cast type, etc.) of each connection so as to distinguish the corresponding sidelink connection. The receiving UE may monitor the wake-up signal in the wake-up signal interval, and when receiving the wake-up signal indicating identification information for a service and connection of interest, it may monitor a reception resource pool and receive a sidelink control signal and data. At this time, by using configuration information on the reception resource pool, sidelink service, and connection mapping information, the UE may monitor the corresponding reception resource pool. If the reception resource pool, sidelink service, and connection mapping information are not configured, the UE may monitor all reception resource pools. In the case that the wake-up signal indicates a reception resource pool to be monitored, the UE may monitor the indicated reception resource pool.

In the case of performing data transmission/reception through a sidelink unicast connection, an operation of measuring and reporting RSRP and an operation of measuring and reporting CSI may be performed to manage a sidelink wireless connection between a transmitting UE and a receiving UE. Next, with reference to FIG. 11, the operation of a UE processing RSRP and CSI for managing a sidelink unicast connection while performing a sidelink DRX operation will be described.

Figure 11:
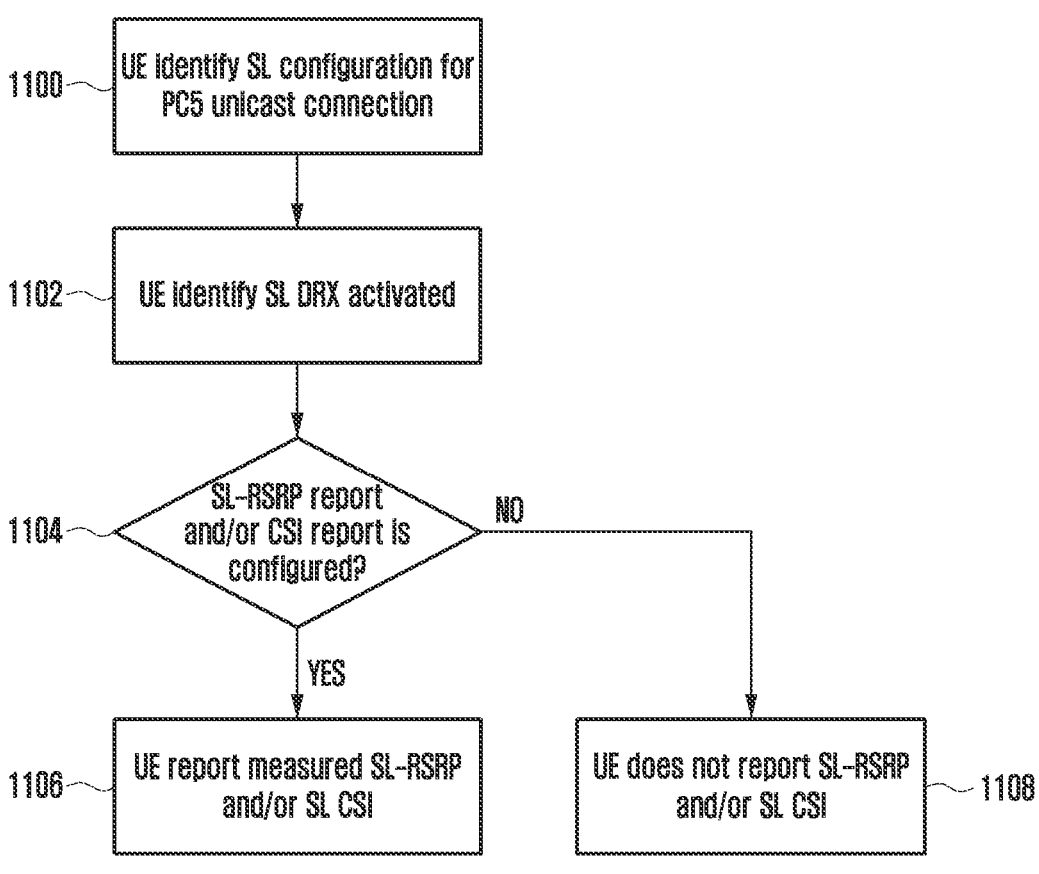
FIG. 11 is a diagram illustrating the operation of a UE processing radio link control information in sidelink DRX according to an embodiment of the disclosure.

FIG. 11 is a diagram illustrating the operation of a UE processing radio link control information in sidelink DRX according to an embodiment of the disclosure.

With reference to FIG. 11, at step 1100, the UE may determine unicast-based sidelink communication configuration information. The unicast-based sidelink communication configuration information may include information on RSRP measurement and report configuration and CSI measurement and report configuration, and may include configuration for RSRP measurement and report and CSI measurement and report while performing sidelink DRX according to an embodiment of the disclosure. This configuration information may include at least one or a combination of an instruction to perform RSRP report and/or CSI report when sidelink DRX is configured, an instruction to perform RSRP report and/or CSI report regardless of sidelink DRX configuration, an instruction to perform RSRP report and/or CSI report in active time of sidelink DRX, an instruction not to perform RSRP report and/or CSI report when it is not active time of sidelink DRX, and an instruction not to perform RSRP report and/or CSI report when sidelink DRX is configured. The configuration information may be transmitted from the base station to the UE or may be preconfigured in the UE. The configuration information may be exchanged through unicast configuration information between UEs. The configuration for RSRP report and/or CSI report may be configured based on QoS characteristics of sidelink service. For example, for a sidelink connection supporting a service for which QoS requirements are configured to increase transmission reliability, increase reception reliability, and reduce packet error rate through transmission power control and radio resource management, it may be configured to perform RSRP and/or CSI report even when sidelink DRX is configured. Upon configuring sidelink DRX, configuration for RSRP and/or CSI report may be made for at least one or a combination of a sidelink flow, a sidelink radio bearer, a sidelink logical channel, and a sidelink destination identifier.

At step 1102, the UE may determine whether sidelink DRX is activated. At step 1104, the UE may determine configuration information for RSRP report and/or CSI report in the case of sidelink DRX configuration. Upon determining at the step 1104 that it is instructed to perform RSRP report and/or CSI report in the case of sidelink DRX configuration, the UE may report the measured RSRP and/or CSI at step 1106. Here, the UE may perform RSRP and/or CSI report in active time or at a configured time point. Upon determining at the step 1104 that it is instructed not to perform RSRP report and/or CSI report in the case of sidelink DRX configuration, the UE may not report RSRP and/or CSI at step 1108. Even in this case, RSRP and/or CSI measurement may be performed according to UE's determination.

The UE performing a sidelink unicast connection in the case that sidelink DRX is configured according to an embodiment of the disclosure may be configured not to report the measured RSRP and/or CSI at a time other than active time. The receiving UE may not report RSRP and/or CSI measurement for a sidelink unicast connection at a time other than active time of sidelink DRX. The transmitting UE may not expect a report on RSRP and/or CSI measurement for a sidelink unicast connection at a time other than active time of sidelink DRX.

In the case that CSI measurement and report for a sidelink unicast connection is configured, the receiving UE instructed to measure and report CSI from the transmitting UE may measure CSI and transmit the measured CSI value to the transmitting UE in response to the CSI measurement and report instruction. In the case that sidelink DRX is operated for the sidelink unicast connection between the transmitting UE and the receiving UE, the time when the receiving UE transmits the CSI measured value to the transmitting UE and the transmitting UE receives the CSI measurement report from the receiving UE may be included in the active time of sidelink DRX.

In the case of measuring and reporting SL RSRP between two UEs when sidelink DRX is configured for the sidelink unicast connection between the transmitting UE and the receiving UE in the embodiment of FIG. 11, the time to receive and transmit the RSRP report between the transmitting UE and the receiving UE should be determined. Therefore, in the case where a periodic RSRP report is configured for RSRP measurement and report configuration between two UEs and the periodic RSRP report is performed, the method of FIG. 11 may be applied In the case that the transmitting UE and the receiving UE perform RSRP report (the transmitting UE receives the RSRP measurement result and the receiving UE transmits the RSRP measurement result) in the sidelink DRX active time of the sidelink unicast connection according to an embodiment of the disclosure, an embodiment of sidelink DRX and sidelink RSRP report parameter configuration is as follows.

of SL-DRX and sl-drx-onDurationTimer of sl-drx-Cycle for the case of periodically reporting RSRP between two UEs.

In the case that the base station configures SL-DRX configuration, the base station configures SL-DRX configuration (sl-drx-Cycle, sl-drx-onDurationTimer, sl-drx-StartOffset, sl-drx-SlotOffset) between two UEs of SL-RSRP measurement and report configuration so that RSRP can be reported in sl-drx-Cycle of SL-DRX and sl-drx-onDurationTimer of sl-drx-Cycle for the case of periodically reporting RSRP between two UEs.

In the case that the UE informs the base station of SL-DRX configuration configured with the counterpart UE, the base station configures SL-RSRP measurement and report configuration so that RSRP can be reported in sl-drx-Cycle and sl-drx-onDurationTimer of sl-drx-Cycle for the case of periodically reporting RSRP between two UEs (This corresponds to the case where the UE in the RRC CONNECTED state reports SL-DRX configuration for sidelink unicast connection to the base station).

When the UE performs RSRP measurement and report for sidelink unicast connection, SL RSRP report configuration for configuring periodic report or event-based report is shown in Table 2 below.

TABLE 2

```
SL-ReportConfig-r16 ::=                          SEQUENCE {
    sl-ReportT ype-r16                             CHOICE {
        sl-Periodical-r16                            SL-PeriodicalReportConfig-r16,
        sl-EventTriggered-r16                        SL-EventTriggerConfig-r16,
        ...
    },
    ...
}
SL-PeriodicalReportConfig-r16 ::=                SEQUENCE {
    sl-ReportInterval-r16                         Reportinterval,
    sl-ReportAmount-r16   ENUMERATED {r1, r2, r4, r8, r16, r32, r64, infinity},
    sl-ReportQuantity-r16                          SL-MeasReportQuantity-r16,
    sl-RS-Type-r16                                 SL-RS-Type-r16,
    ...
}
SL-EventTriggerConfig-r16 ::=                    SEQUENCE {
    sl-EventId-r16                                 CHOICE {
        eventS1-r16                                  SEQUENCE {
            s1-Threshold-r16                           SL-MeasTriggerQuantity-r16,
            sl-ReportOnLeave-r16                       BOOLEAN,
            sl-Hysteresis-r16                          Hysteresis,
            sl-TimeToTrigger-r16                       TimeToTrigger,
            ...
        },
        eventS2-r16                                  SEQUENCE {
            s2-Threshold-r16                           SL-MeasTriggerQuantity-r16,
            sl-ReportOnLeave-r16                       BOOLEAN,
            sl-Hysteresis-r16                          Hysteresis,
            sl-TimeToTrigger-r16                       TimeToTrigger,
            ...
```

(1) In the case that the periodic report is configured, parameter values of SL RSRP measurement and report configuration and SL DRX configuration may be configured such that RSRP report can be performed in active time. Parameters that enable the RSRP report to be performed in active time may be at least one or a combination of sl-ReportInterval, sl-drx-Cycle, sl-drx-onDurationTimer of sl-drx-Cycle, sl-drx-StartOffset, and sl-drx-SlotOffset in SL-PeriodicalReportConfig.

In the case that the UE configures SL-DRX configuration, the UE configures SL-DRX configuration (sl-drx-Cycle, sl-drx-onDurationTimer, sl-drx-StartOffset, sl-drx-SlotOffset) between two UEs of SL-RSRP measurement and report configuration so that RSRP can be reported in sl-drx-Cycle In the case that sidelink DRX is configured for the sidelink unicast connection between the transmitting UE and the receiving UE according to an embodiment of the disclosure, an operation of transmitting and receiving the RSRP report may be performed by applying at least one or a combination of the following schemes for the case in which configuration of measuring and reporting the SL RSRP for the sidelink unicast connection between the transmitting UE and the receiving UE is configured to report event-based RSRP.

(Scheme 1)

When the receiving UE measures the RSRP for the sidelink unicast connection and determines that an event of reporting the RSRP is satisfied, the receiving UE may report to the transmitting UE the RSRP measured in the next sidelink DRX cycle, that is, in the active time of the next closest sidelink DRX cycle.

When the receiving UE measures the RSRP for the sidelink unicast connection and determines that an event of reporting the RSRP is satisfied, the receiving UE may transmit the RSRP report to the transmitting UE in the active time of the current sidelink DRX cycle upon determining that the SL RSRP measurement result can be reported in the active time of the current sidelink DRX cycle. Otherwise, the receiving UE may report the SL RSRP measurement result in the active time of the next closest sidelink DRX cycle.

However, in the above scheme 1, if the RSRP measurement value cannot be transmitted to the transmitting UE at the time when it is determined that the RSRP report event is satisfied according to the determination of the receiving UE, that is, if it is determined that the time of the RSRP measurement report cannot be included in the active time of the sidelink DRX cycle between the transmitting UE and the receiving UE, the receiving UE should delay reporting the RSRP measurement value until the active time of the next closest sidelink DRX cycle. In this case, the RSRP measurement value of the time when the receiving UE determines to report the RSRP measurement value may no longer be valid at the time when the RSRP measurement value can be reported. In this case, there is a possibility that the transmitting UE will receive a report of an inaccurate RSRP value.

The following schemes 2, 3, and 4 can be used together with the scheme 1 to compensate for the case where RSRP measurement and report of the scheme 1 are not valid. In the case that the sidelink DRX is configured and the SL RSRP measurement and report are configured in the sidelink unicast connection between the transmitting UE and the receiving UE, the transmitting UE and the receiving UE can transmit and receive the SL RSRP measurement value report using at least one or a combination of schemes 1, 2, 3, and 4.

(Scheme 2) A Scheme of Using a Validity Timer or Latency Bound for RSRP for RSRP Measurement Values For the event triggered configuration of the RSRP measurement and report configuration between the transmitting UE and the receiving UE, the validity timer parameters may be configured as shown in Table 3.

TABLE 3

| |
|---|
| sl-RSRP-Report-Validity (sl-LatencyBoundRSRP-Report) INTEGER (X1...X2) |
| Sl-RSRP-Report-Validity (sl-LatencyBoundRSRP-Report) |
| Indicate the latency bound of SL RSRP report from the associated SL RSRP report triggering in terms of number of slots. |

Upon determining that the RSRP measurement report event is satisfied, the receiving UE may determine the validity of the RSRP measurement value based on the time corresponding to the active time of the next closest DRX cycle to report the RSRP measurement value and the configured validity timer.

(Example 2-1 of UE operation) If the receiving UE determines that the time corresponding to the active time of the next closest DRX cycle to report the RSRP measurement value cannot satisfy the RSRP validity timer, the receiving UE may not report the RSRP in the active time of the corresponding DRX cycle.

(Example 2-2 of UE operation) If the receiving UE determines that the time corresponding to the active time of the next closest DRX cycle to report the RSRP measurement value cannot satisfy the RSRP validity timer, the receiving UE may not report the corresponding RSRP (RSRP report generated for event-based report). If there is an RSRP value measured at the time corresponding to the active time of the next closest DRX cycle, the receiving UE may report to the transmitting UE the RSRP measurement value generated regardless of event occurrence.

(Scheme 3) A Scheme in which the Transmitting UE Configures, to the Receiving UE, Whether the Receiving UE Delays Reporting Until the Next Closes Sidelink DRX Cycle, in the Case that the RSRP Report Event is Satisfied in the Receiving UE Upon determining that the RSRP measurement report event is satisfied, the receiving UE may determine whether the RSRP can be reported in the active time of the current sidelink DRX cycle. If it is determined that the measured RSRP cannot be reported in the active time of the current sidelink DRX cycle (i.e., when the time to report the measured RSRP is not the active time of the current sidelink DRX cycle), the receiving UE may determine whether it is allowed to delay RSRP reporting until the active time of the next sidelink DRX cycle. In an embodiment, if RSRP reporting is allowed to be delayed until the active time of the next sidelink DRX cycle, the receiving UE may report the RSRP to the transmitting UE in the active time of the next sidelink DRX cycle. If it is determined that the measured RSRP cannot be reported in the active time of the current sidelink DRX cycle and it is determined that RSRP reporting is not allowed to be delayed until the active time of the next sidelink DRX cycle, the receiving UE may not report the measured RSRP.

As another embodiment, the schemes 2 and 3 may be applied together.

(Embodiment A) If it is determined that the measured RSRP cannot be reported in the active time of the current sidelink DRX cycle, RSRP reporting is allowed to be delayed until the active time of the next sidelink DRX cycle, and the validity timer of the scheme 2 is satisfied, the receiving UE may report the RSRP to the transmitting UE in the active time of the next sidelink DRX cycle. If it is determined that the measured RSRP cannot be reported in the active time of the current sidelink DRX cycle, RSRP reporting is allowed to be delayed until the active time of the next sidelink DRX cycle, and the validity timer of the scheme 2 is not satisfied, the receiving UE may not report the measured RSRP to the transmitting UE.

(Embodiment B) If it is determined that the measured RSRP cannot be reported in the active time of the current sidelink DRX cycle, RSRP reporting is allowed to be delayed until the active time of the next sidelink DRX cycle, and the validity timer of the scheme 2 is satisfied, the receiving UE may report the RSRP to the transmitting UE in the active time of the next sidelink DRX cycle. If it is determined that the measured RSRP cannot be reported in the active time of the current sidelink DRX cycle, RSRP reporting is allowed to be delayed until the active time of the next sidelink DRX cycle, and the validity timer of the scheme 2 is not satisfied, the receiving UE may not report the measured RSRP and, if there is an RSRP value measured in the active time of the next sidelink DRX cycle, report this RSRP to the transmitting UE.

(Scheme 4) Case in which the Validity Timer or Latency Bound for RSRP is not Configured for the Sidelink Unicast Connection Between the Transmitting UE and the Receiving UE In the case that the sidelink DRX is in operation and the SL RSRP measurement and report are configured for the sidelink unicast connection between the transmitting UE and the receiving UE, the validity timer or latency bound for RSRP of the above scheme 2 applicable to transmitting and receiving the event-based SL RSRP report in the active time of the sidelink DRX cycle may not be configured. Upon determining that the sidelink DRX is configured for the sidelink unicast connection with the transmitting UE and the SL RSRP measurement and the event-based report are configured, the receiving UE may determine whether the RSRP can be reported to the transmitting UE in the active time of the current sidelink cycle in the case that the SL RSRP report event is satisfied. If the RSRP can be reported in the active time of the current sidelink cycle, the receiving UE may report the measured RSRP to the transmitting UE. If it is determined that the RSRP cannot be reported in the active time of the current sidelink cycle, the receiving UE does not report the measured RSRP to the transmitting UE.

The transmitting UE may be allocated a resource for transmitting a sidelink control signal and data from a base station or may allocate a resource by itself. A scheme in which the UE processes sidelink transmission resources in an inactive time when there is no need to transmit data while performing a sidelink DRX operation will be described with reference to FIG. 12. The description of FIG. 12 assumes that only one of sidelink resource allocation mode 1 (base station scheduling mode) and sidelink resource allocation mode 2 (UE direct scheduling mode) is configured. In the case that the sidelink resource allocation mode 1 and the sidelink resource allocation mode 2 are configured together, the UE may perform processing for the sidelink resource allocation mode 1 and processing for the sidelink resource allocation mode 2, respectively.

Figure 12:
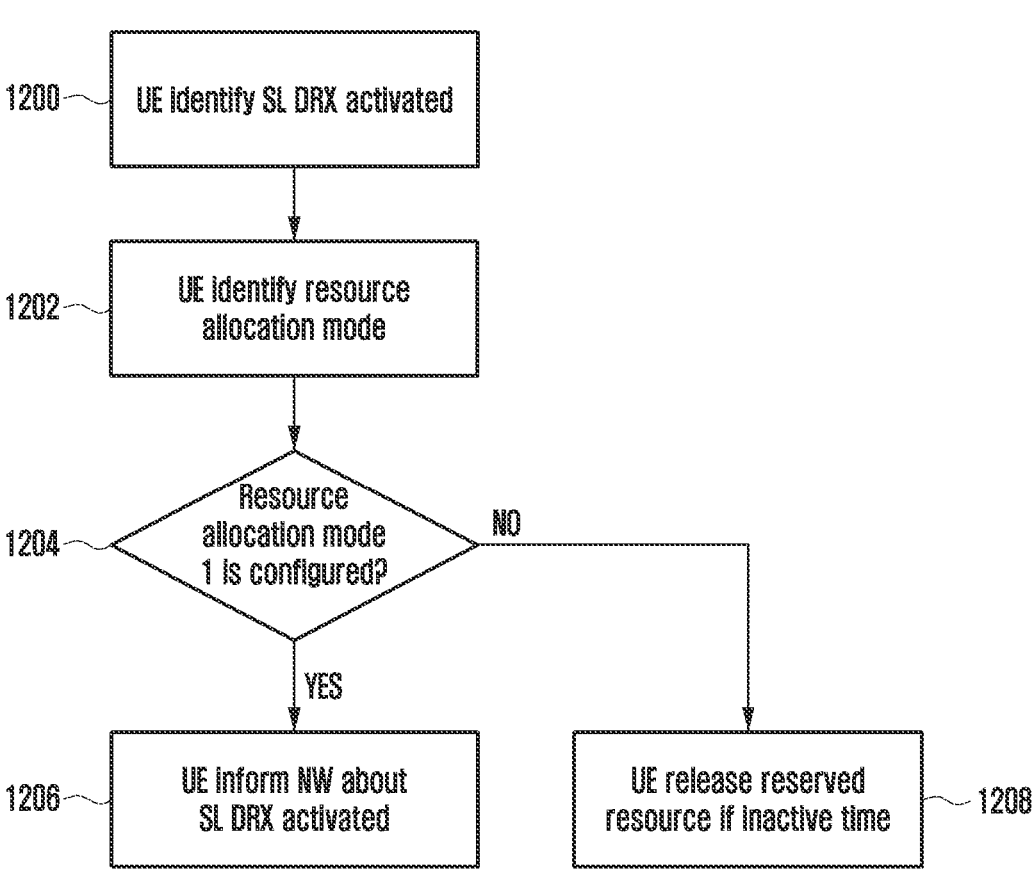
FIG. 12 is a diagram illustrating the operation of a UE processing sidelink resource allocation in sidelink DRX according to an embodiment of the disclosure.

FIG. 12 is a diagram illustrating the operation of a UE processing sidelink resource allocation in sidelink DRX according to an embodiment of the disclosure.

With reference to FIG. 12, at step 1200, the UE may determine that sidelink DRX is configured. At step 1202, the UE may determine a sidelink resource allocation mode. At step 1204, the UE may determine whether the sidelink resource allocation mode is configured as mode 1. If it is determined at the step 1204 that the sidelink resource allocation mode 1 is configured, the UE may notify sidelink DRX activation to the base station at step 1206. At the step 1206, the UE may transmit signaling notifying proceeding to the sidelink DRX inactive time to the base station at the time of proceeding to the inactive time of the sidelink DRX. This signaling may be transmitted to the base station for the purpose of requesting release of sidelink transmission resources allocated to the UE. The UE may transmit signaling notifying proceeding to the sidelink DRX active time to the base station at the time of proceeding to the active time of the sidelink DRX. This signaling may be transmitted to the base station for the purpose of requesting sidelink transmission resource allocation to the UE. Upon receiving signaling from the UE informing proceeding to the sidelink DRX inactive time, the base station may not allocate sidelink transmission resources to the UE in the sidelink DRX inactive time. In the case that transmission resources have already been configured in the UE based on configuration of a sidelink configured grant type 1 or a sidelink configured grant type 2, the base station may not allocate already configured resources to the UE or allocate already configured resources to other UEs based on sidelink DRX inactive time indication information of the UE. In the case that transmission resources have already been configured in the UE based on configuration of a sidelink configured grant type 1 or a sidelink configured grant type 2, the UE may release the configured and allocated or reserved resources while proceeding to the inactive time of the sidelink DRX. In the case that the UE transmits signaling to the base station at the time of proceeding to the sidelink DRX inactive time or the time of proceeding to the sidelink DRX active time, this signaling may include at least one of an RRC message, a MAC CE, and signaling transmitted in the physical uplink control channel (PUCCH) (e.g., a part of PUCCH resources transmitting sidelink HARQ feedback may be used for sidelink DRX active time indication or inactive time indication). According to an embodiment of the disclosure, the UE and the base station may release sidelink transmission resources allocated to the UE based on mode 1, based on sidelink DRX cycle information of the UE. The sidelink DRX cycle information of the UE may be transmitted and received through an RRC message or MAC CE exchanged between the base station and the UE.

If it is determined at the step 1204 that the sidelink resource allocation mode 2 is configured, the UE may release at step 1208 the allocated or reserved sidelink transmission resources in the case of the sidelink DRX inactive time. The UE may transmit a signal instructing release of allocated or reserved sidelink transmission resources through the sidelink channel Here, the UE may transmit a sidelink control signal (SCI) indicating an instruction to release allocated or reserved sidelink transmission resources. When there is data to be transmitted by proceeding to the active time of the sidelink DRX, the UE may perform a sidelink transmission resource allocation procedure for generated data. In an embodiment of the disclosure, instead of releasing allocated or reserved sidelink transmission resources, the UE may transmit a sidelink control signal (SCI) indicating an instruction allowing the use of sidelink transmission resources to another UE while proceeding to the inactive time of sidelink DRX.

Next, with reference to FIGS. 13A to 13C, a scheme of operating sidelink transmission resources to be used for the transmitting UE to transmit a sidelink wake-up signal in the WUS monitoring intervals 900 and 902 of FIG. 9A or the SL WUS occasions 1010, 1012, and 1014 of FIG. 10A will be described.

Figure 13A:
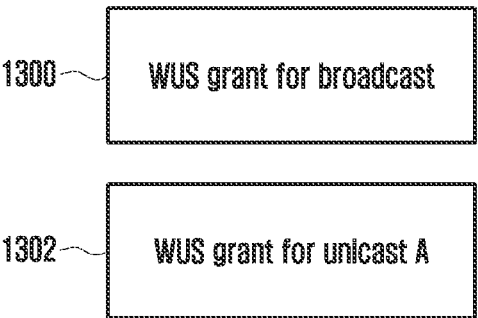
FIG. 13A is a diagram illustrating a scheme of allocating sidelink DRX WUS transmission resources according to an embodiment of the disclosure.
Figure 13B:
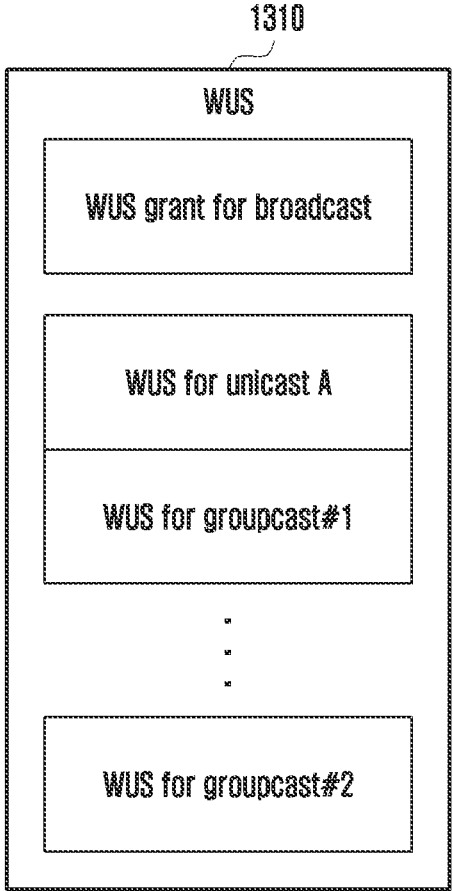
FIG. 13B is a diagram illustrating a scheme of allocating sidelink DRX WUS transmission resources according to an embodiment of the disclosure.
Figure 13C:
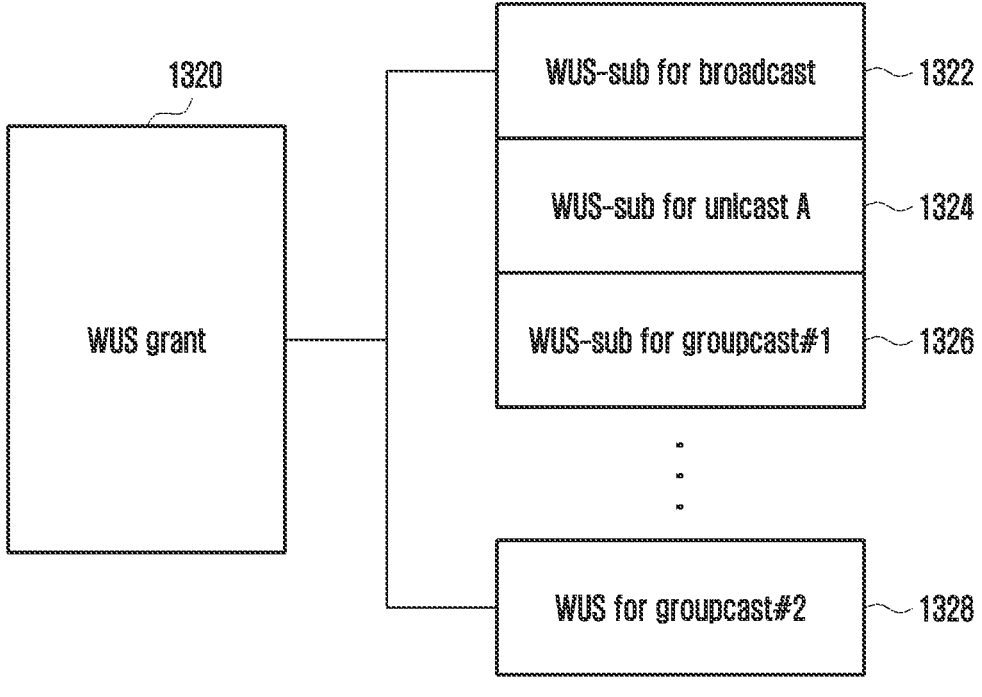
FIG. 13C is a diagram illustrating a scheme of allocating sidelink DRX WUS transmission resources according to an embodiment of the disclosure.

FIGS. 13A to 13C are diagrams illustrating a scheme of allocating sidelink DRX WUS transmission resources according to an embodiment of the disclosure.

With reference to FIGS. 13A to 13C, in the embodiment of FIG. 13A, sidelink resources may be allocated as many as the number of sidelink wake-up signals transmitted by the transmitting UE in the WUS monitoring interval or the SL WUS occasion. In the case of transmitting a wake-up signal for broadcast and a wake-up signal for unicast A in the WUS monitoring interval or the SL WUS occasion, the transmitting UE may acquire a sidelink transmission resource 1300 for transmitting the broadcast wake-up signal and a sidelink transmission resource 1302 for transmitting the unicast A wake-up signal. In the case of mode 1 in which the base station allocates sidelink transmission resources, the transmitting UE may inform the base station about the number of wake-up signals to be transmitted. In the case of mode 2 in which the UE allocates transmission resources, the transmitting UE may select as many sidelink resources as the number of wake-up signals to be transmitted.

In the embodiment of FIG. 13B, there is one sidelink wake-up signal transmitted by the transmitting UE in the WUS monitoring interval or the SL WUS occasion, and the wake-up signal may include one or more wake-up indication information. In this case, the maximum number of wake-up indication information that can be included in one sidelink wake-up signal may be configured, and when it is necessary to transmit wake-up indication information exceeding the maximum number in the WUS monitoring interval or the SL WUS occasion, the UE may transmit one or more sidelink wake-up signals.

In the embodiment of FIG. 13B, a sidelink wake-up signal 1310 transmitted by the transmitting UE may include broadcast wake-up instruction information, unicast A wake-up instruction information, groupcast #1 wake-up instruction information, and groupcast #2 wake-up instruction information. The UE may acquire sidelink transmission resources for transmitting the wake-up signal 1310 in the WUS monitoring interval or the SL WUS occasion. In the case of mode 1 in which the base station allocates sidelink transmission resources, the transmitting UE may inform the base station about the number of wake-up signals to be transmitted. In the case of mode 2 in which the UE allocates transmission resources, the transmitting UE may select as many sidelink resources as the number of wake-up signals to be transmitted.

In the embodiment of FIG. 13C, the transmitting UE may be allocated one sidelink resource for transmission of a sidelink wake-up signal in the WUS monitoring interval or the SL WUS occasion. In the case of having to transmit one or more wake-up signals through the sidelink transmission resource, the UE may device the transmission resource into sub-units and allocate resources of each sub-unit to each wake-up signal.

In the embodiment of FIG. 13C, upon determining that wake-up signals should be transmitted for broadcast, unicast A, groupcast #1, and groupcast #2, the UE may acquire a wake-up signal resource 1320 including the wake-up signals. The UE may divide the acquired resource 1320 and allocate the divided resources to a broadcast wake-up signal 1322, a unicast A wake-up signal 1324, a groupcast #1 wake-up signal 1326, and a groupcast #2 wake-up signal 1328. In the case of mode 1 in which the base station allocates sidelink transmission resources, the transmitting UE may inform the base station about the number of wake-up signals to be transmitted and may be allocated one wake-up signal transmission resource. The UE may divide and use the allocated sidelink resources by the number of wake-up signals. In the case of mode 2 in which the UE allocates transmission resources, the transmitting UE may select one sidelink resource that can be transmitted as many as the number of wake-up signals to be transmitted.

The methods according to embodiments set forth in claims or specification of the disclosure may be implemented in the form of hardware, software, or a combination thereof.

When implemented in software, a computer readable storage medium storing one or more programs (software modules) may be provided. One or more programs stored in the computer readable storage medium are configured for execution by one or more processors in an electronic device. One or more programs include instructions for causing an electronic device to execute methods according to embodiments described in claims or specifications of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other types of optical storage devices, or magnetic cassettes. Alternatively, such programs may be stored in a memory configured with a combination of some or all thereof. Further, each configuration memory may be included in the plural.

Further, the program may be stored in an attachable storage device that may access through a communication network such as Internet, Intranet, a local area network (LAN), a wide area network (WAN), or a storage area network (SAN), or a communication network configured with a combination thereof. Such a storage device may access to a device implementing an embodiment of the disclosure through an external port. Further, a separate storage device on the communication network may access to the device implementing the embodiment of the disclosure.

In the specific embodiments of the disclosure described above, components included in the disclosure are expressed in the singular or the plural according to the presented specific embodiments. However, the singular or plural expression is appropriately selected for the presented situation for convenience of description, and the disclosure is not limited to the singular or plural components, and even if the component is expressed in the plural, the component may be configured with the singular, or even if the component is expressed in the singular, the component may be configured with the plural.

Although specific embodiments have been described in the detailed description of the disclosure, various modifications are possible without departing from the scope of the disclosure. Therefore, the scope of the disclosure should not be limited to the described embodiments and should be defined by claims set forth below as well as equivalents to claims.

The invention claimed is:

1. A method performed by a first user equipment (UE) in a wireless communication system supporting a sidelink (SL) communication, the method comprising:

transmitting, to a second UE, first information for configuring a SL discontinuous reception (DRX) and second information associated with a channel state information (CSI) report of the SL including SL measurement configuration information, configuration information for a CSI, and an indication not to perform the CSI report when the second UE is not in an active time of the SL DRX;

transmitting, to the second UE, a SL CSI report request; and receiving, from the second UE, the SL CSI report within the active time based on the first information and the second information, wherein the active time for the SL DRX is associated with the transmission of the SL CSI report request and the reception of the SL CSI report.

2. The method of claim 1, wherein the first information includes at least one of a drx-inactivity timer, a drx-onduration timer, or a drx-retransmission timer.

3. A method performed by a second user equipment (UE) in a wireless communication system supporting a sidelink (SL) communication, the method comprising:

receiving, from a first UE, first information for configuring a SL discontinuous reception (DRX) and second information associated with a channel state information (CSI) report of the SL including SL measurement configuration information, configuration information for a CSI, and an indication not to perform the CSI report when the second UE is not in an active time of the SL DRX;

receiving, from the first UE, a SL channel state information (CSI) report request; and transmitting, to the first UE, the SL CSI report within the active time based on the first information and the second information, wherein the active time for the SL DRX is associated with the reception of the SL CSI report request and the transmission of the SL CSI report.

4. The method of claim 3, wherein the transmitting of the SL CSI comprises:

selecting a resource for transmitting the SL CSI report from resource pools which occur within the active time; and transmitting, to the first UE, the SL CSI report based on the selected resource.

5. The method of claim 3, wherein the first information includes at least one of a drx-inactivity timer, a drx-onduration timer, or a drx-retransmission timer.

6. A first user equipment (UE) in a wireless communication system supporting a sidelink (SL) communication, the first UE comprising:

a transceiver; and a controller, coupled with the transceiver, configured to:

transmit, to a second UE, first information for configuring a SL discontinuous reception (DRX) and second information associated with a channel state information (CSI) report of the SL including SL measurement configuration information, configuration information for a CSI, and an indication not to perform the CSI report when the second UE is not in an active time of the SL DRX, transmit, to the second UE, a SL CSI report request, and receive, from the second UE, the SL CSI report within the active time based on the first information and the second information, wherein the active time for the SL DRX is associated with the transmission of the SL CSI report request and the reception of the SL CSI report.

7. The first UE of claim 6, wherein the first information includes at least one of a drx-inactivity timer, a drx-onduration timer, or a drx-retransmission timer.

8. A second user equipment (UE) in a wireless communication system supporting a sidelink (SL) communication, the second UE comprising:

a transceiver; and a controller, coupled with the transceiver, configured to:

receive, from a first UE, first information for configuring a SL discontinuous reception (DRX) and second information associated with a channel state information (CSI) report of the SL including SL measurement configuration information, configuration information for a CSI, and an indication not to perform the CSI report when the second UE is not in an active time of the SL DRX, receive, from the first UE, a SL channel state information (CSI) report request, and transmit, to the first UE, the SL CSI report within the active time based on the first information and the second information, wherein the active time for the SL DRX is associated with the reception of the SL CSI report request and the transmission of the SL CSI report.

9. The second UE of claim 8, wherein the controller is further configured to:

select a resource for transmitting the SL CSI report from resource pools which occur within the active time, and transmit, to the first UE, the SL CSI report based on the selected resource.

10. The second UE of claim 8, wherein the first information includes at least one of a drx-inactivity timer, a drx-onduration timer, or a drx-retransmission timer.

* * * * *